US012671472B2

(12) United States Patent
Zheng et al.

(10) Patent No.: US 12,671,472 B2
(45) Date of Patent: Jun. 30, 2026

(54) METHODS AND APPARATUSES FOR DETERMINING OAM BEAM TRANSMISSION DIRECTION, TERMINAL DEVICES, ACCESS NETWORK DEVICES AND STORAGE MEDIA

(71) Applicant: Beijing Xiaomi Mobile Software Co., Ltd., Beijing (CN)

(72) Inventors: Feng Zheng, Beijing (CN); Gaoming Duan, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 352 days.

(21) Appl. No.: 18/552,565

(22) PCT Filed: Mar. 26, 2021

(86) PCT No.: PCT/CN2021/083412
§ 371 (c)(1),
(2) Date: Sep. 26, 2023

(87) PCT Pub. No.: WO2022/198669
PCT Pub. Date: Sep. 29, 2022

(65) Prior Publication Data
US 2024/0187057 A1 Jun. 6, 2024

(51) Int. Cl.
*H04B 7/06* (2006.01)
(52) U.S. Cl.
CPC .................................... *H04B 7/06* (2013.01)
(58) Field of Classification Search
CPC ................................ H04B 7/06; H04B 7/0617
See application file for complete search history.

(56) References Cited

U.S. PATENT DOCUMENTS

| | | | |
|---|---|---|---|
| 2015/0357710 | A1 | 12/2015 | Li |
| 2019/0149251 | A1 | 5/2019 | Zenkyu |
| 2021/0273686 | A1* | 9/2021 | Jansson ................ H04B 7/0695 |

(Continued)

FOREIGN PATENT DOCUMENTS

| | | |
|---|---|---|
| CN | 103986531 A | 8/2014 |
| CN | 107078779 A | 8/2017 |
| CN | 108282208 A | 7/2018 |

(Continued)

OTHER PUBLICATIONS

ISA State Intellectual Property Office of the People's Republic of China, International Search Report Issued in Application No. PCT/CN2021/083412, Dec. 30, 2021, WIPO, 4 pages.

(Continued)

*Primary Examiner* — Ayodeji O Ayotunde
(74) *Attorney, Agent, or Firm* — Volpe Koenig

(57) ABSTRACT

The present disclosure provides a method and apparatus for determining an OAM beam transmission direction, a terminal device, an access network device and a storage medium and belongs to the field of communication technologies. The method includes: determining, by a sender, a plurality of transmitting directions; based on the plurality of transmitting directions, sequentially transmitting a plurality of first OAM beams to a receiver; receiving beam information sent by the receiver, and based on the beam information, determining the OAM beam transmission direction.

19 Claims, 9 Drawing Sheets

(56) References Cited

U.S. PATENT DOCUMENTS

2022/0408426 A1 * 12/2022 Horn .................... H04W 72/51

FOREIGN PATENT DOCUMENTS

| | | | |
|---|---|---|---|
| CN | 108631068 | A | 10/2018 |
| CN | 109946642 | A | 6/2019 |
| KR | 20170099679 | A | 9/2017 |
| WO | 2020001761 | A1 | 1/2020 |

OTHER PUBLICATIONS

Chen, Rui et al. "Beam Steering for the Misalignment in UCA-BasedOAM Communication Systems", IEEE Wireless Communications Letters, vol. 7, No. 4, Aug. 31, 2018, 4 pages.

L. Allen et al. "Orbital angular momentum of light and the transformation of Laguerre-Gaussian laser modes,", Phys. Rev. A: At. Mol. Opt. Phys., vol. 45,No. 11, pp. 8185-8189, Jun. 1, 1992, 6 pages.

F. Tamburini et al. "Encoding many channels in the same frequency through radio vorticity: first experimental test,", New J. Phys., vol. 14, No. 3, p. 033001, Nov. 7, 2012, 18 pages.

X. Gao et al. "Misalignment Measurement of Orbital Angular Momentum Signal Based on Spectrum Analysis and Image Processing," in IEEE Transactions on Antennas and Propagation, vol. 68, No. 1, pp. 521-526, Jan. 2020, 7 pages.

Chinese Office Action issued on Feb. 5, 2026 for Chinese Patent Application No. 202180000932.4.

* cited by examiner

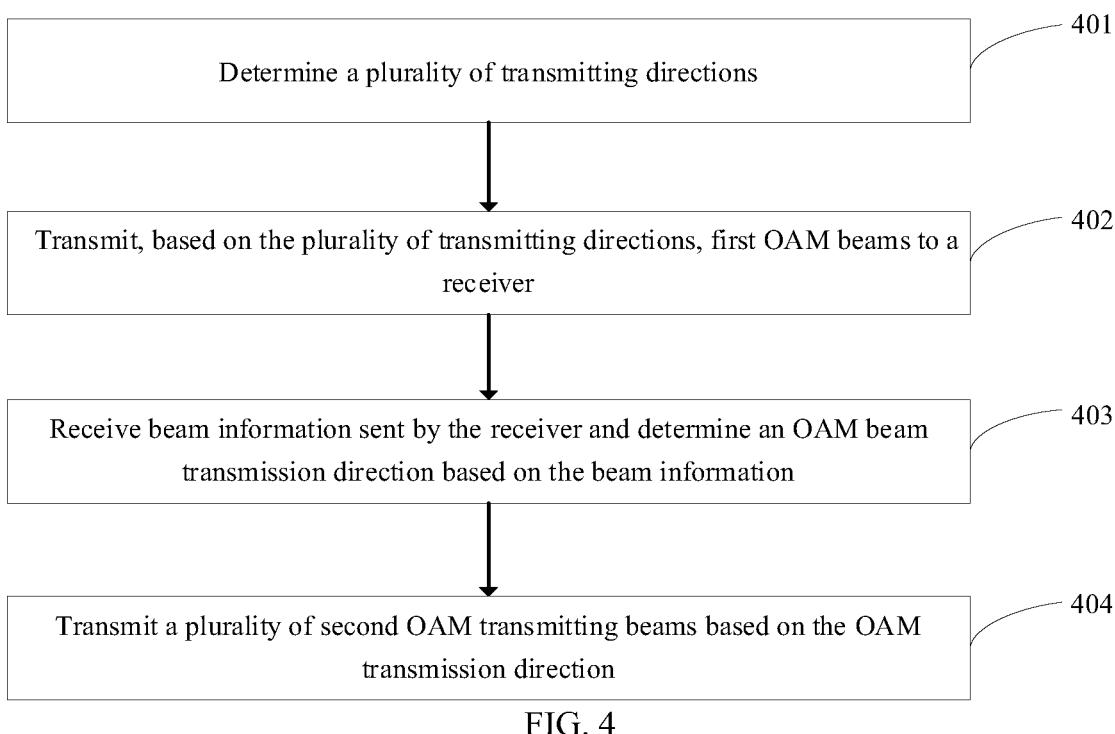

Determine a plurality of transmitting directions — 401

Transmit, based on the plurality of transmitting directions, first OAM beams to a receiver — 402

Receive beam information sent by the receiver and determine an OAM beam transmission direction based on the beam information — 403

Transmit a plurality of second OAM transmitting beams based on the OAM transmission direction — 404

FIG. 4

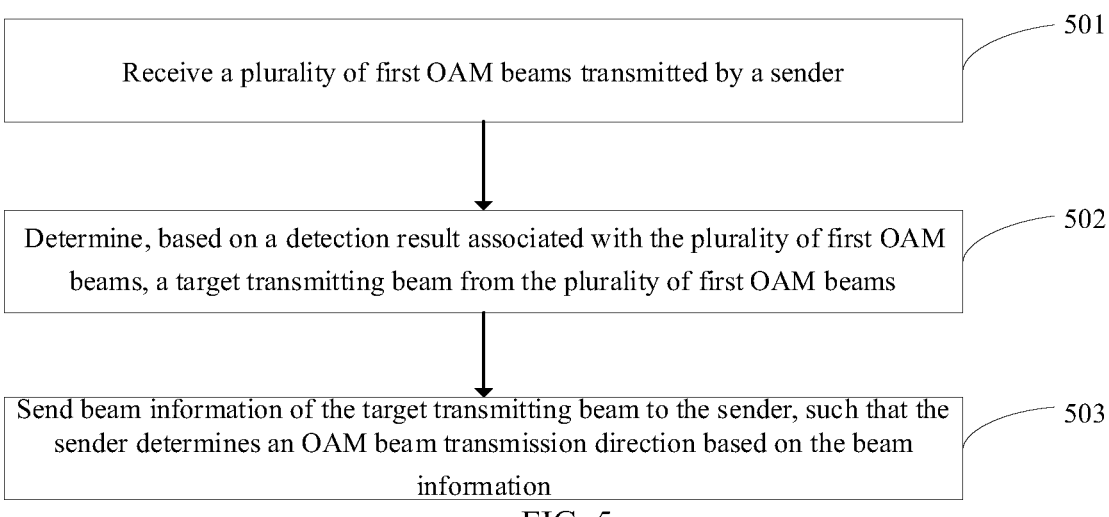

Receive a plurality of first OAM beams transmitted by a sender — 501

Determine, based on a detection result associated with the plurality of first OAM beams, a target transmitting beam from the plurality of first OAM beams — 502

Send beam information of the target transmitting beam to the sender, such that the sender determines an OAM beam transmission direction based on the beam information — 503

FIG. 5

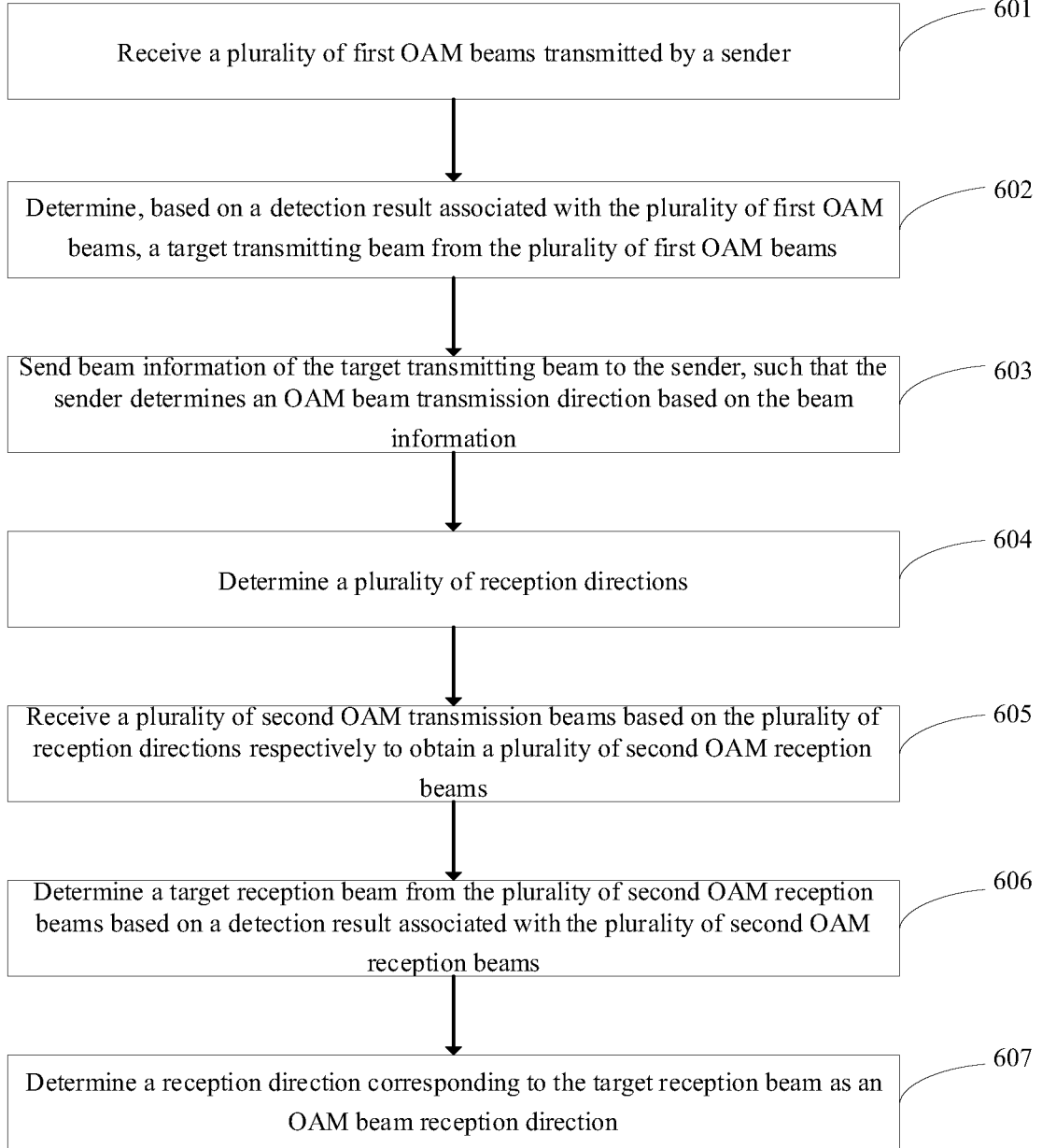

Receive a plurality of first OAM beams transmitted by a sender — 601

Determine, based on a detection result associated with the plurality of first OAM beams, a target transmitting beam from the plurality of first OAM beams — 602

Send beam information of the target transmitting beam to the sender, such that the sender determines an OAM beam transmission direction based on the beam information — 603

Determine a plurality of reception directions — 604

Receive a plurality of second OAM transmission beams based on the plurality of reception directions respectively to obtain a plurality of second OAM reception beams — 605

Determine a target reception beam from the plurality of second OAM reception beams based on a detection result associated with the plurality of second OAM reception beams — 606

Determine a reception direction corresponding to the target reception beam as an OAM beam reception direction — 607

Apparatus for determining an OAM
beam transmission direction

—1001

Determining module

—1002

Transmitting module

—1003

Receiving module

—1100

Apparatus for determining an OAM
beam transmission direction

—1101

Receiving module

—1102

Determining module

—1103

Sending module

METHODS AND APPARATUSES FOR DETERMINING OAM BEAM TRANSMISSION DIRECTION, TERMINAL DEVICES, ACCESS NETWORK DEVICES AND STORAGE MEDIA

CROSS-REFERENCE TO RELATED APPLICATIONS

This application is a national stage of international PCT Application No. PCT/CN2021/083412 filed on Mar. 26, 2021, the entire contents of which are incorporated herein by reference.

TECHNICAL FIELD

The present disclosure relates to the field of communication technologies and, in particular, to methods and apparatuses for determining an OAM beam transmission direction, terminal devices, access network devices and storage media.

BACKGROUND

Orbital angular momentum (OAM), as a new modulation dimension, is capable of transmitting multiple pieces of information in a same frequency band at the same time, which can effectively solve the shortage of spectral resources. At present, an OAM communication system is usually established based on Uniform circular array (UCA). The OAM communication system established based on UCA requires a transceiver antenna to be axis-aligned to ensure communication efficiency. However, in actual situations, the axis of the transceiver antenna may be in a non-ideal alignment state. At this time, it is required to adopt a compensation solution to control a radiation direction of an OAM beam to align with the reception direction so as to ensure system performance.

In the related arts, when the OAM beam is controlled to align the radiation direction of the OAM beam with the reception direction, it is usually required to, obtain a deflection state of a transceiver array in advance, or compare a spectral analysis result of a signal received by a reception array with a frequency spectrum under alignment to estimate the deflection state of the transceiver array. Then based on the deflection state of the transceiver array, control the radiation direction of the OAM beam. However, the error of obtaining or estimating the deflection state of the transceiver array is large, and the costs are high. Further, since it is unknown whether the obtained deflection state of the transceiver array is an actual deflection state of the transceiver array, the communication effect will be affected. Furthermore, the method of controlling the OAM beam radiation direction in the related arts can only support static model, leading to a limited application scope.

SUMMARY

The present disclosure provides methods and apparatuses for determining an OAM beam transmission direction, terminal devices, access network devices and storage media, so as to solve, when performing OAM communication in the related arts, the technical problems of a large error resulting from the need to know the deflection state of the transceiver array, high costs, and poor communication effect and the technical problems of limited application scope of the OAM communication in the related arts.

According to an aspect of embodiments of the present disclosure, there is provided a method of determining an OAM beam transmission direction, which is performed by a sender. The method includes: determining a plurality of transmitting directions; transmitting, based on the plurality of transmitting directions, a plurality of first OAM beams to a receiver; and receiving beam information from the receiver, and determining, based on the beam information, an OAM beam transmission direction.

According to another aspect of embodiments of the present disclosure, there is provided a method of determining an OAM beam transmission direction, which is performed by a receiver. The method includes: receiving a plurality of first OAM beams transmitted by a sender; determining, based on a detection result associated with the plurality of first OAM beams, a target transmitting beam from the plurality of first OAM beams; and sending beam information of the target transmitting beam to the sender such that the sender determines an OAM beam transmission direction based on the beam information.

According to another aspect of embodiments of the present disclosure, there is provided an apparatus for determining an OAM beam transmission direction, including: a determining module, configured to determine a plurality of transmitting directions; a transmitting module, configured to sequentially transmit, based on the plurality of transmitting directions, a plurality of first OAM beams to a receiver; and a receiving module, configured to receive beam information from the receiver, and determine, based on the beam information, an OAM beam transmission direction.

According to another aspect of embodiments of the present disclosure, there is provided an apparatus for determining an OAM beam transmission direction, including: a receiving module, configured to receive a plurality of first OAM beams transmitted by a sender; a determining module, configured to determine, based on a detection result associated with the plurality of first OAM beams, a target transmitting beam from the plurality of first OAM beams; and a sending module, configured to send beam information of the target transmitting beam to the sender such that the sender determines an OAM beam transmission direction based on the beam information.

According to another aspect of embodiments of the present disclosure, there is provided a terminal device, including a transceiver; a memory; and a processor connected with the transceiver and the memory and configured to execute computer executable instructions in the memory to control wireless signal reception and transmission of the transceiver and perform the method according to any one of the above embodiments.

According to another aspect of embodiments of the present disclosure, there is provided an access network device, including a transceiver; a memory; and a processor respectively connected with the transceiver and the memory and configured to execute computer executable instructions in the memory to control wireless signal reception and transmission of the transceiver and perform the method according to any one of the above embodiments.

According to another aspect of embodiments of the present disclosure, there is provided a computer storage medium that stores computer executable instructions, wherein the computer executable instructions are executed by a processor to perform the method according to any one of the above embodiments.

In the method of determining an OAM beam transmission direction according to the embodiments of the present disclosure, the sender determines a plurality of transmitting directions, and then based on the plurality of transmitting directions, sequentially transmits a plurality of first OAM beams to the receiver, and then receives beam information from the receiver, and then based on the beam information, determines an OAM beam transmission direction. And the receiver determines a plurality of reception directions, and based on the plurality of reception directions, respectively receives a plurality of second OAM transmitting beams transmitted by the sender to obtain a plurality of second OAM reception beams, and then based on signal qualities of the plurality of second OAM reception beams, determines an OAM beam reception direction. Thus, in the embodiments of the present disclosure, an effective OAM beam transmission direction and OAM beam reception direction can be respectively determined simply based on the plurality of determined transmitting directions of the sender and the plurality of determined reception directions of the receiver, without obtaining the deflection state of the transceiver array. Hence, in spite of the deflection state of the transceiver array being unknown, the OAM communication can still be implemented, which avoids the problems of a large error resulting from the need to know the deflection state of the transceiver array and high costs, and effectively solves the technical problems of the OAM communication under non-alignment condition, leading to a good communication effect.

Furthermore, in the embodiments of the present disclosure, before the sender sends the OAM beam or the receiver receives the OAM beam each time, the method provided by the embodiments of the present disclosure is carried out. Thus, in spite of the sender being in a motion state or the receiver being in a motion state, each time the sender sends an OAM beam, the sender may first determine an effective OAM beam transmission direction, and then, based on the OAM beam transmission direction, send the OAM beam to achieve communication. Further, each time the receiver receives an OAM beam, the receiver may first determine an effective OAM beam reception direction and then, based on the OAM beam reception direction, receive the OAM beam. Therefore, the method provided by the embodiments of the present disclosure can be applied to mobile communication scenarios, bringing a wide application scope.

The additional aspects and advantages of the present disclosure will be given partially in the following descriptions and partially become apparent from the following descriptions or understood from the practice of the present disclosure.

BRIEF DESCRIPTION OF DRAWINGS

The above and/or additional aspects and advantages of the present disclosure will become apparent and intelligible from the descriptions of the embodiments in combination with the drawings.

FIG. 4 is a flowchart illustrating a method of determining an OAM beam transmission direction according to another embodiment of the present disclosure.

FIG. 5 is a flowchart illustrating a method of determining an OAM beam transmission direction according to another embodiment of the present disclosure.

FIG. 6 is a flowchart illustrating a method of determining an OAM beam transmission direction according to another embodiment of the present disclosure.

DETAILED DESCRIPTION

Figure 1:
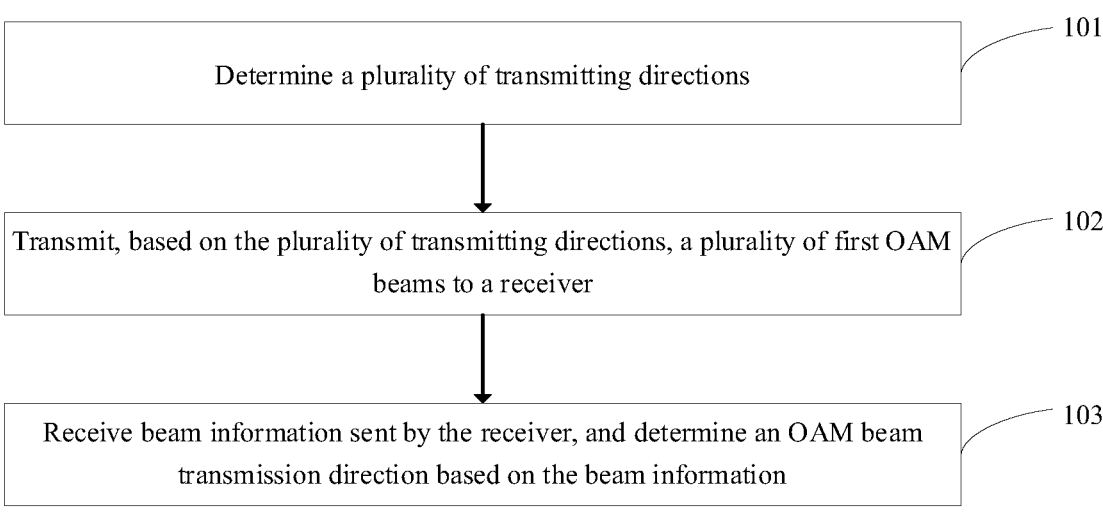
FIG. 1 is a flowchart illustrating a method of determining an OAM beam transmission direction according to an embodiment of the present disclosure.

Exemplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the", and "said" in their singular forms in the present disclosure and the appended claims are also intended to include plurality, unless clearly indicated otherwise in the context. It should also be understood that the term "and/or" as used herein refers to and includes any or all possible combinations of one or more of the associated listed items.

It is to be understood that, although the terms "first," "second," "third," and the like may be used in the present disclosure to describe various information, such information should not be limited to these terms. These terms are only used to distinguish one category of information from another. For example, without departing from the scope of the present disclosure, first information may be referred to as second information; and similarly, the second information may also be referred to as the first information. Depending on the context, the term "if" as used herein may be interpreted as "when" or "upon" or "in response to determining".

The embodiments of the present disclosure will be described in detail below with the examples of the embodiments shown in the drawings. The same or similar numerals represent same or similar elements throughout. The embodiments described by referring to the drawings are only illustrative and used to interpret the present disclosure rather than limit the present disclosure.

In the method of determining an OAM beam transmission direction according to the embodiments of the present disclosure, the sender determines a plurality of transmitting directions, and then based on the plurality of transmitting directions, sequentially transmits a plurality of first OAM beams to the receiver, and then receives beam information from the receiver, and then based on the beam information, determines an OAM beam transmission direction. Thus, in the embodiments of the present disclosure, an effective OAM beam transmission direction can be determined simply based on the plurality of determined transmitting directions, without obtaining the deflection state of the transceiver array. Hence, in spite of the deflection state of the transceiver array being unknown, the OAM communication can still be implemented, which avoids the problems of a large error resulting from the need to know the deflection state of the transceiver array and high costs, and effectively solves the technical problems of the OAM communication under non-alignment conditions, leading to a good communication effect.

Furthermore, in the embodiments of the present disclosure, before the sender sends an OAM beam each time, the method provided by the embodiments of the present disclosure is carried out. Thus, in spite of the sender being in a motion state, each time the sender sends an OAM beam, the sender may first determine an effective OAM beam transmission direction and then, based on the OAM beam transmission direction, send the OAM beam to achieve communication. As a result, the method provided by the embodiments of the present disclosure may also be applied to mobile communication scenarios, bringing a wide application scope.

Methods and apparatuses for determining an OAM beam transmission direction, terminal devices, access network devices, and storage media according to the embodiments of the present disclosure will be detailed below with reference to the drawings.

FIG. 1 is a flowchart illustrating a method of determining an OAM beam transmission direction according to an embodiment of the present disclosure, which is performed by a sender. As shown in FIG. 1, the method of determining an OAM beam transmission direction can include the following steps 101-103.

At step 101, a plurality of transmitting directions is determined.

It should be noted that the sender can be an access network device (e.g., base station), or a user equipment (UE). The sender in the embodiments of the present disclosure can be any UE or any base station. The UE can be a device directed toward a user to provide voice and/or data connectivity. The UE can communicate with one or more core networks through a radio access network (RAN). The UE can be a terminal of internet of things, such as a sensor device, a mobile phone, (or called cellular phone), and a computer having a terminal of internet of things, such as a fixed, portable, pocket-sized, handheld, or computer-inbuilt or vehicle-mounted apparatus, such as station (STA), subscriber unit, subscriber station, mobile station, mobile, remote station, access point, remote terminal, access terminal, user terminal, or user agent. Optionally, the UE can also be a device of an unmanned aerial vehicle, or a vehicle-mounted device, for example, a trip computer having a wireless communication function, or a wireless terminal externally connected to a trip computer. Optionally, the UE can be a roadside device, for example, a road lamp, signal lamp, or other roadside devices having a wireless communication function.

In an embodiment of the present disclosure, the plurality of transmitting directions can be determined based on transmitting azimuth angles of the OAM beams and/or transmitting elevation angles of the OAM beams. The transmitting azimuth angle is an included angle between a projection of an OAM beam axis on a uniform circular array (UCA) surface of the sender and a coordinate axis of a UCA of the sender, and the transmitting elevation angle is an included angle between the OAM beam axis and a UCA plane normal of the sender. The coordinate axis of the UCA of the sender can be any coordinate axis in a coordinate system established on the UCA of the sender. In an embodiment of the present disclosure, the coordinate system established on the UCA of the sender can be a coordinate system established with a circle center of the UCA of the sender as an origin and with the plane where the UCA of the sender is located as an XOY plane.

At step 102, based on the plurality of transmitting directions, a plurality of first OAM beams are transmitted to a receiver.

In an embodiment of the present disclosure, when the sender transmits a plurality of first OAM beams based on the plurality of transmitting directions, the receiver always receives the plurality of first OAM beams based on a fixed reception direction.

In an embodiment of the present disclosure, the sender can sequentially transmit a plurality of first OAM beams based on a specific time interval or sequentially transmit a plurality of first OAM beams based on unequal time intervals.

In an embodiment of the present disclosure, the sender can sequentially transmit a plurality of first OAM beams based on a plurality of transmitting directions. In another embodiment of the present disclosure, the sender may not sequentially transmit a plurality of first OAM beams based on a plurality of transmitting directions but ensure that a plurality of transmitted first OAM beams can cover a plurality of reception directions of the receiver.

At step 103, beam information sent by the receiver is received, and an OAM beam transmission direction is determined based on the beam information.

In an embodiment of the present disclosure, the beam information received by the sender can be beam information corresponding to a target transmitting beam selected by the receiver from a plurality of first OAM beams based on a detection result associated with the plurality of first OAM beams. In an embodiment of the present disclosure, the receiver can, based on signal qualities of the plurality of first OAM beams, determine a beam with an optimal signal quality in the plurality of first OAM reception beams as a target reception beam. The beam information can include a transmitting azimuth angle and/or transmitting elevation angle corresponding to the target transmitting beam. For example, the detection result associated with the plurality of first OAM beams can include a signal strength (e.g., Reference Signal Receiving Power (RSRP)) and/or a signal quality (e.g., Reference Signal Receiving Quality (RSRQ)) of the first OAM beams or a Channel State Information (CSI) estimation for indicating channel states of the first OAM beams or the like.

In an embodiment of the present disclosure, the receiver can select, based on the RSRP and/or RSRQ, a target transmitting beam from a plurality of first OAM beams. In an embodiment of the present disclosure, a beam with a maximum RSRP and/or a maximum RSRQ in the plurality of first OAM beams is determined as the target transmitting beam.

In an embodiment of the present disclosure, the receiver can select, based on a Bit Error Rate (BER) and/or a Block Error Ratio (BLER), the target transmitting beam from a plurality of first OAM beams. In an embodiment of the present disclosure, a beam with a minimum BER and/or a minimum BLER in the plurality of first OAM beams is determined as the target transmitting beam.

It should be noted that, in an embodiment of the present disclosure, before the sender sends an OAM beam each time, the method shown in FIG. 1 can be implemented such that each time the sender sends an OAM beam, a corresponding OAM beam transmission direction can be determined.

In the method of determining an OAM beam transmission direction according to the embodiments of the present disclosure, the sender determines a plurality of transmitting directions, and then based on the plurality of transmitting directions, sequentially transmits a plurality of first OAM beams to the receiver, and then receives beam information from the receiver, and then based on the beam information, determines an OAM beam transmission direction. Thus, in the embodiments of the present disclosure, an effective OAM beam transmission direction can be determined simply based on the plurality of determined transmitting directions, without obtaining the deflection state of the transceiver array. Hence, in spite of the deflection state of the transceiver array being unknown, the OAM communication can still be implemented. This avoids the problems of a large error resulting from the need to know the deflection state of the transceiver array and high costs, and effectively solves the technical problems of the OAM communication under non-alignment conditions, leading to a good communication effect.

Furthermore, in the embodiments of the present disclosure, before the sender sends an OAM beam each time, the method provided by the embodiments of the present disclosure is carried out. Thus, in spite of the sender being in a motion state, each time the sender sends an OAM beam, the sender can firstly determine an effective OAM beam transmission direction and then, based on the OAM beam transmission direction, send the OAM beam to achieve communication. As a result, the method provided by the embodiments of the present disclosure can also be applied to mobile communication scenarios, bringing a wide application scope.

Figure 2:
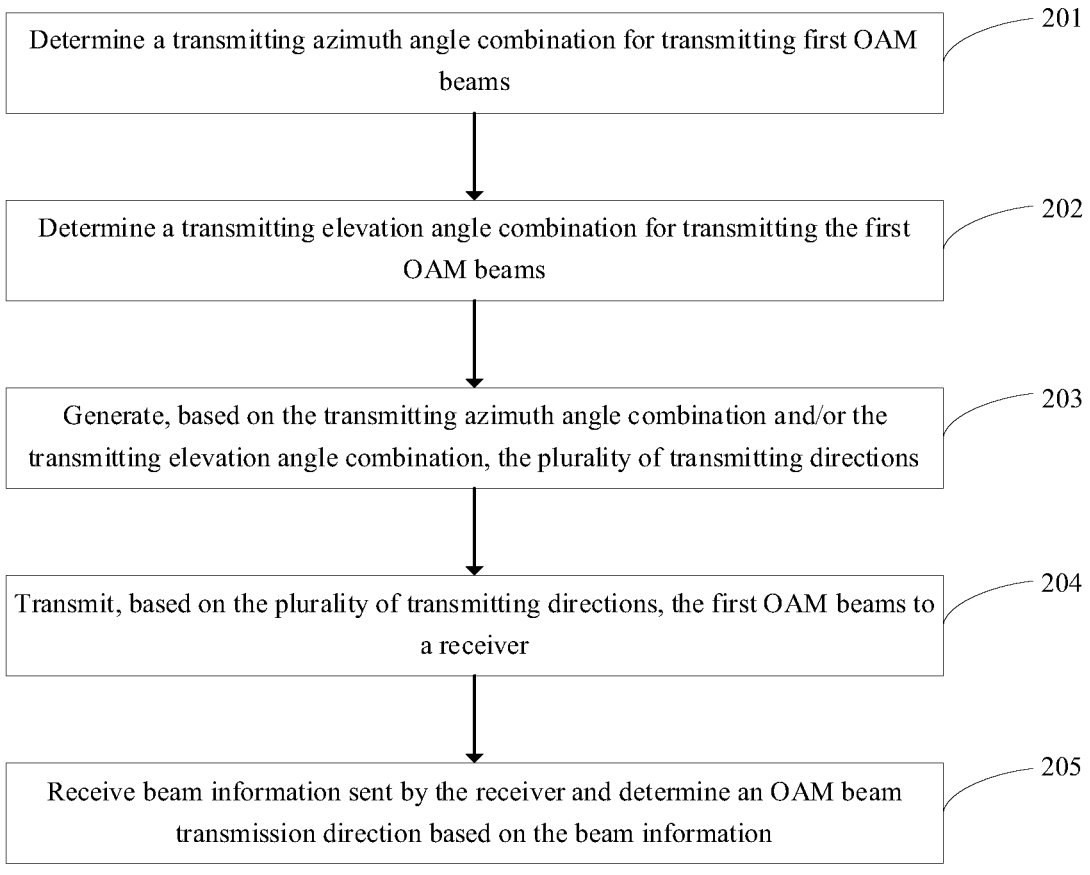
FIG. 2 is a flowchart illustrating a method of determining an OAM beam transmission direction according to another embodiment of the present disclosure.

FIG. 2 is a flowchart illustrating a method of determining an OAM beam transmission direction according to another embodiment of the present disclosure, which is performed by a sender. As shown in FIG. 2, the method of determining an OAM beam transmission direction can include the following steps 201-205.

At step 201, a transmitting azimuth angle combination for transmitting first OAM beams is determined.

The transmitting azimuth angle combination includes a plurality of transmitting azimuth angles, one of which is an included angle between a projection of a first OAM beam axis on a uniform circular array (UCA) surface of the sender and a coordinate axis of a UCA of the sender.

The coordinate axis of the UCA of the sender can be any coordinate axis in a coordinate system established on the UCA surface of the sender. The manner of establishing the coordinate system can include: establishing the coordinate system with a circle center of the UCA of the sender as an origin and with the plane where the UCA of the sender is located as an XOY plane.

In an embodiment of the present disclosure, the transmitting azimuth angle combination can be:

$$\left\{ \frac{2\pi \times m}{M_1}, (m = 0, 1, 2 \ldots M_1) \right\};$$

where M1 is an integer used to indicate a number of the transmitting azimuth angles in the transmitting azimuth angle combination.

At step 202, a transmitting elevation angle combination for transmitting the first OAM beams is determined.

The transmitting elevation angle combination includes a plurality of transmitting elevation angles, one of which is an included angle between the first OAM beam axis and a UCA plane normal of the sender.

In an embodiment of the present disclosure, the transmitting elevation angle combination can be:

$$\left\{ \frac{\pi \times n}{N_1}, \left( n = 0, 1, 2 \ldots \frac{N_1}{2} \right) \right\};$$

where N1 is an integer used to indicate a number of the transmitting elevation angles in the transmitting elevation angle combination.

At step 203, based on the transmitting azimuth angle combination and/or the transmitting elevation angle combination, the plurality of transmitting directions are generated.

In an embodiment of the present disclosure, the sender can determine a transmitting direction based on any one transmitting azimuth angle of the transmitting azimuth angle combination and/or any one transmitting elevation angle of the transmitting elevation angle combination. Thus, a plurality of transmitting directions can be generated by traversing all transmitting azimuth angles of the transmitting azimuth angle combination and/or all transmitting elevation angles of the transmitting elevation angle combination.

It should be noted that the larger the M1 and N1 are, the more the transmitting azimuth angles of the transmitting azimuth angle combination and the transmitting elevation angles of the transmitting elevation angle combination are. Hence, more transmitting directions can be determined based on the transmitting azimuth angle combination and/or the transmitting elevation angle combination, and it is more probable that the OAM beam transmission direction finally determined is an optimal transmission direction. Thus, improving the accuracy of determining an OAM beam transmission direction.

At step 204, based on the plurality of transmitting directions, the first OAM beams are transmitted to a receiver.

In an embodiment of the present disclosure, when the sender transmits the first OAM beams based on the plurality of transmitting directions, the receiver always receives the first OAM beams based on a fixed reception direction.

At step 205, beam information sent by the receiver is received, and an OAM beam transmission direction is determined based on the beam information.

In an embodiment of the present disclosure, the beam information received by the sender can be beam information corresponding to a target transmitting beam selected by the receiver from a plurality of first OAM beams based on a detection result associated with the plurality of first OAM beams.

In an embodiment of the present disclosure, the receiver can determine a beam with an optimal signal quality in a plurality of first OAM reception beams as a target reception beam based on the signal qualities of the plurality of first OAM beams. The beam information can include a transmitting azimuth angle and/or transmitting elevation angle corresponding to the target transmitting beam.

In an embodiment of the present disclosure, the receiver can select the target transmitting beam from a plurality of first OAM beams based on RSRP and/or RSRQ. In an embodiment of the present disclosure, a beam with a maximum RSRP and/or a maximum RSRQ in a plurality of first OAM beams is determined as the target transmitting beam.

In another embodiment of the present disclosure, the receiver can select the target transmitting beam from a plurality of first OAM beams based on BER and/or BLER. In an embodiment of the present disclosure, a beam with a minimum BER and/or a minimum BLER in a plurality of first OAM beams is determined as the target transmitting beam.

It should be noted that, in an embodiment of the present disclosure, before the sender sends an OAM beam each time, the method shown in FIG. 2 can be implemented such that each time the sender sends an OAM beam, a corresponding OAM beam transmission direction can be determined.

In the method of determining an OAM beam transmission direction according to the embodiments of the present disclosure, the sender determines a plurality of transmitting directions, and then based on the plurality of transmitting directions, sequentially transmits a plurality of first OAM beams to the receiver, and then receives beam information from the receiver, and then based on the beam information, determines an OAM beam transmission direction. Thus, in the embodiments of the present disclosure, an effective OAM beam transmission direction can be determined simply based on the plurality of determined transmitting directions, without obtaining the deflection state of the transceiver array. Hence, in spite of the deflection state of the transceiver array being unknown, the OAM communication can still be implemented, which avoids the problems of a large error resulting from the need to know the deflection state of the transceiver array and high costs. Thus, effectively solving the technical problems of the OAM communication under non-alignment conditions, leading to a good communication effect.

Furthermore, in the embodiments of the present disclosure, before the sender sends an OAM beam each time, the method provided by the embodiments of the present disclosure is carried out, and thus, in spite of the sender being in a motion state, each time the sender sends an OAM beam, the sender can firstly determine an effective OAM beam transmission direction and then based on the OAM beam transmission direction, send the OAM beam to achieve communication. As a result, the method provided by the embodiments of the present disclosure can also be applied to mobile communication scenarios, bringing a wide application scope.

Figure 3:
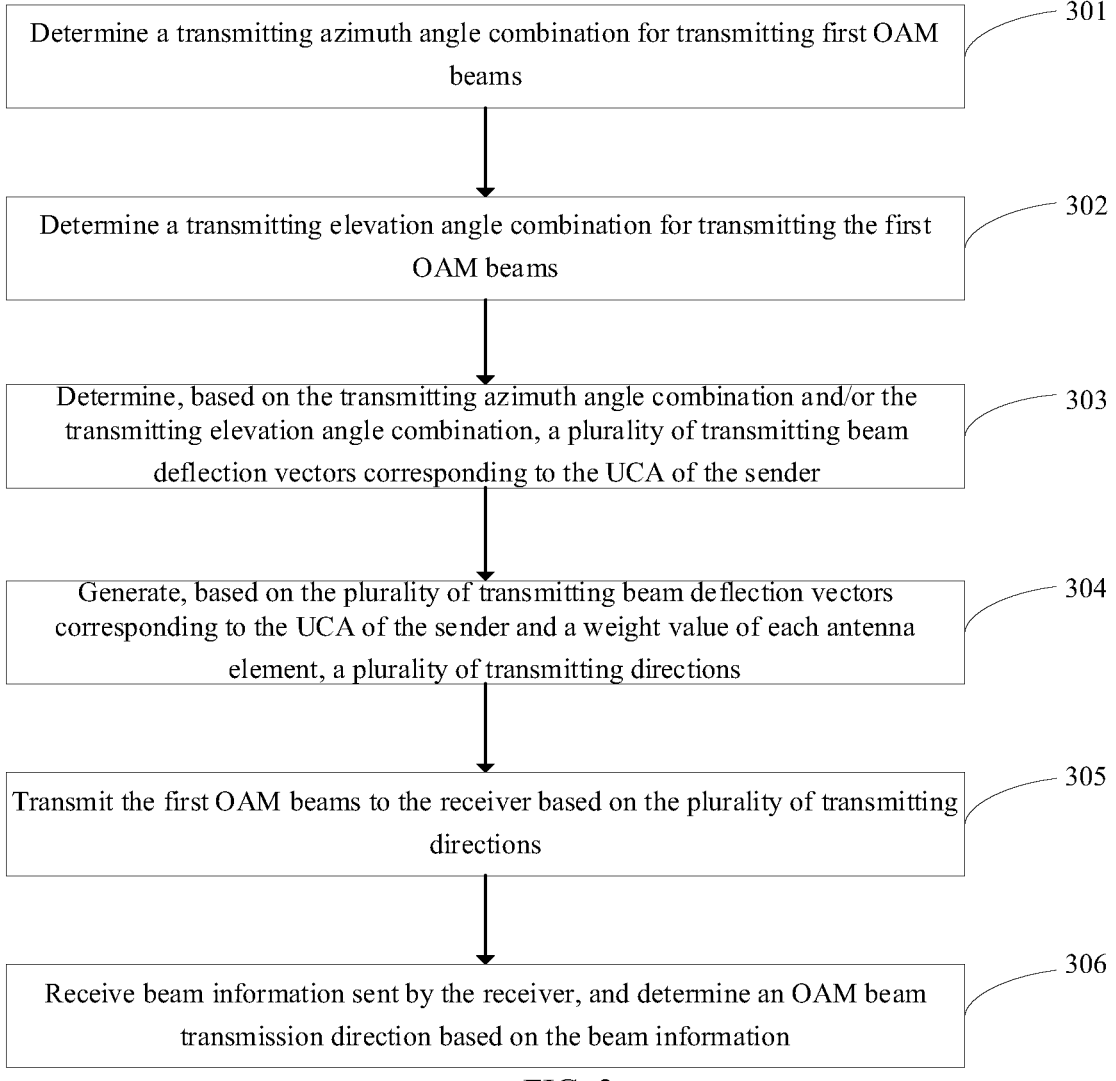
FIG. 3 is a flowchart illustrating a method of determining an OAM beam transmission direction according to another embodiment of the present disclosure.

FIG. 3 is a flowchart illustrating a method of determining an OAM beam transmission direction according to another embodiment of the present disclosure, which is performed by a sender. As shown in FIG. 3, the method of determining an OAM beam transmission direction can include the following steps 301-306.

At step 301, a transmitting azimuth angle combination for transmitting first OAM beams is determined.

The transmitting azimuth angle combination includes a plurality of transmitting azimuth angles, one of which is an included angle between a projection of a first OAM beam axis on a uniform circular array (UCA) surface of the sender and a coordinate axis of a UCA of the sender.

The coordinate axis of the UCA of the sender can be any coordinate axis in a coordinate system established on the UCA surface of the sender. The manner of establishing the coordinate system can include: establishing the coordinate system with a circle center of the UCA of the sender as an origin and with the plane where the UCA of the sender is located as an XOY plane.

In an embodiment of the present disclosure, the transmitting azimuth angle combination can be:

$$\left\{ \frac{2\pi \times m}{M_1}, (m = 0, 1, 2 \ldots M_1) \right\};$$

where $M_1$ is an integer used to indicate a number of the transmitting azimuth angles in the transmitting azimuth angle combination.

At step 302, a transmitting elevation angle combination for transmitting the first OAM beams is determined.

The transmitting elevation angle combination includes a plurality of transmitting elevation angles, one of which is an included angle between the first OAM beam axis and a UCA plane normal of the sender.

In an embodiment of the present disclosure, the transmitting elevation angle combination can be:

$$\left\{ \frac{\pi \times n}{N_1}, \left( n = 0, 1, 2 \ldots \frac{N_1}{2} \right) \right\};$$

where $N_1$ is an integer used to indicate a number of the transmitting elevation angles in the transmitting elevation angle combination.

At step 303, based on the transmitting azimuth angle combination and/or the transmitting elevation angle combination, a plurality of transmitting beam deflection vectors corresponding to the UCA of the sender are determined.

The transmitting beam deflection vectors corresponding to the UCA of the sender include a beam deflection vector corresponding to each antenna element of the UCA of the sender. The beam deflection vectors corresponding to respective antenna elements in the UCA of the sender are different. Furthermore, in an embodiment of the present disclosure, when the transmitting azimuth angle and/or the transmitting elevation angle is different, the transmitting beam deflection vector corresponding to the UCA of the sender is also different.

In an embodiment of the present disclosure, the transmitting beam deflection vector $W_{1(m,n)}$ corresponding to an i-th antenna element is $$W_{1(m,n)} = e^{j\frac{2\pi}{\lambda}R_{t1}\cos\left(\varphi_{m1} + \frac{2\pi i}{K}\right)\sin(\theta_{n1})}.$$

Where $\lambda$ represents a wavelength of the first OAM beam, $R_{t1}$ represents a radius of the UCA of the sender, $\varphi_{m1}$ represents any one transmitting azimuth angle of the transmitting azimuth angle combination, $\theta_{n1}$ represents any one transmitting elevation angle of the transmitting elevation angle combination, j is a complex number, and K is an integer used to indicate the number of the UCA antenna elements of the sender.

It can be known that based on a transmitting azimuth angle and/or a transmitting elevation angle, a transmitting beam deflection vector corresponding to the UCA of the sender can be determined. Thus, a plurality of transmitting beam deflection vectors corresponding to the UCA of the sender can be determined by traversing all transmitting azimuth angles of the transmitting azimuth angle combination and/or all transmitting elevation angles of the transmitting elevation angle combination.

At step 304, based on the plurality of transmitting beam deflection vectors corresponding to the UCA of the sender and a weight value of each antenna element, a plurality of transmitting directions are generated.

In an embodiment of the present disclosure, each antenna element corresponds to a weight value a: $a = e^{jl\varphi}$;

where l represents a modal of the OAM, $\varphi$ represents an included angle between a projection of the antenna element on the UCA surface of the sender and the coordinate axis of the UCA of the sender, and j is a complex number.

In an embodiment of the present disclosure, based on the plurality of transmitting beam deflection vectors corresponding to the UCA of the sender and the weight value of each antenna element, generating the plurality of transmitting directions can include: for each antenna element included in the transmitting beam deflection vectors corresponding to the UCA of the sender, based on a product of the transmitting beam deflection vector corresponding to the antenna element and the weight value of the antenna element, generating a transmitting direction, and determining a plurality of transmitting directions by traversing the plurality of transmitting beam deflection vectors corresponding to the UCA of the sender.

At step 305, the first OAM beams are transmitted to the receiver based on the plurality of transmitting directions.

In an embodiment of the present disclosure, when the sender transmits the first OAM beams based on the plurality of transmitting directions, the receiver always receives the first OAM beams based on a fixed reception direction.

At step 306, beam information sent by the receiver is received, and an OAM beam transmission direction is determined based on the beam information.

In an embodiment of the present disclosure, the beam information received by the sender can be beam information corresponding to a target transmitting beam selected by the receiver from a plurality of first OAM beams based on a detection result associated with the plurality of first OAM beams. In an embodiment of the present disclosure, the receiver can determine a beam with an optimal signal quality in a plurality of first OAM beams as a target transmitting beam based on the signal qualities of the plurality of first OAM beams. The beam information can include a transmitting azimuth angle and/or transmitting elevation angle corresponding to the target transmitting beam.

In an embodiment of the present disclosure, the receiver can select the target transmitting beam from a plurality of first OAM beams based on RSRP and/or RSRQ. In an embodiment of the present disclosure, a beam with a maximum RSRP and/or a maximum RSRQ in a plurality of first OAM beams is determined as the target transmitting beam.

In another embodiment of the present disclosure, the receiver can select the target transmitting beam from a plurality of first OAM beams based on BER and/or BLER.

In an embodiment of the present disclosure, a beam with a minimum BER and/or a minimum BLER in a plurality of first OAM beams is determined as the target transmitting beam.

It should be noted that, in an embodiment of the present disclosure, before the sender sends an OAM beam each time, the method shown in FIG. 3 can be implemented such that each time the sender sends an OAM beam, a corresponding OAM beam transmission direction can be determined.

In the method of determining an OAM beam transmission direction according to the embodiments of the present disclosure, the sender determines a plurality of transmitting directions, and then based on the plurality of transmitting directions, sequentially transmits a plurality of first OAM beams to the receiver, and then receives beam information sent by the receiver, and then based on the beam information, determines the OAM beam transmission direction. Thus, in the embodiments of the present disclosure, an effective OAM beam transmission direction can be determined simply based on the plurality of determined transmitting directions, without obtaining the deflection state of the transceiver array. Hence, in spite of the deflection state of the transceiver array being unknown, the OAM communication can still be implemented. This avoids the problems of a large error resulting from the need to know the deflection state of the transceiver array and high costs, and effectively solves the technical problems of the OAM communication under non-alignment conditions, leading to a good communication effect.

Furthermore, in the embodiments of the present disclosure, before the sender sends an OAM beam each time, the method provided by the embodiments of the present disclosure is carried out, and thus, in spite of the sender being in a motion state, each time the sender sends an OAM beam, the sender can firstly determine an effective OAM beam transmission direction and then based on the OAM beam transmission direction, send the OAM beam to achieve communication. As a result, the method provided by the embodiments of the present disclosure can also be applied to mobile communication scenarios, bringing wide application scope.

FIG. 4 is a flowchart illustrating a method of determining an OAM beam transmission direction according to an embodiment of the present disclosure, which is performed by a sender. As shown in FIG. 4, the method of determining an OAM beam transmission direction can include the following steps 401-404.

At step 401, a plurality of transmitting directions are determined.

It should be noted that the sender can be a base station or a user equipment (UE). The sender in the embodiments of the present disclosure can be any UE or any access network device (e.g., base station).

In an embodiment of the present disclosure, the plurality of transmitting direction based on which the sender transmits the OAM beams can be generated based on the transmitting azimuth angle and/or transmitting elevation angle of the OAM beam. One of the transmitting azimuth angles is an included angle between a projection of an OAM beam axis on a uniform circular array (UCA) surface of the sender and a coordinate axis of a UCA of the sender, and one of the transmitting elevation angles is an included angle between the OAM beam axis and a UCA plane normal of the sender. The coordinate axis of the UCA of the sender can be any coordinate axis in a coordinate system established on the UCA of the sender. In an embodiment of the present disclosure, the coordinate system established on the UCA of the sender can be a coordinate system established with a circle center of the UCA of the sender as an origin and with the plane where the UCA of the sender is located as an XOY plane.

At step 402, based on the plurality of transmitting directions, first OAM beams are transmitted to a receiver.

In an embodiment of the present disclosure, when the sender transmits the first OAM beams based on the plurality of transmitting directions, the receiver always receives the first OAM beams based on a fixed reception direction.

At step 403, beam information sent by the receiver is received and an OAM beam transmission direction is determined based on the beam information.

In an embodiment of the present disclosure, the beam information received by the sender can be beam information corresponding to a target transmitting beam selected by the receiver from a plurality of first OAM beams based on a detection result associated with the plurality of first OAM beams. In an embodiment of the present disclosure, the receiver can determine a beam with an optimal signal quality in a plurality of first OAM beams as a target transmitting beam based on the signal qualities of the plurality of first OAM beams. The beam information can include a transmitting azimuth angle and/or transmitting elevation angle corresponding to the target transmitting beam.

In an embodiment of the present disclosure, the receiver can select the target transmitting beam from a plurality of first OAM beams based on RSRP and/or RSRQ. In an embodiment of the present disclosure, a beam with a maximum RSRP and/or a maximum RSRQ in a plurality of first OAM beams is determined as the target transmitting beam.

In another embodiment of the present disclosure, the receiver can select the target transmitting beam from a plurality of first OAM beams based on BER and/or BLER. In an embodiment of the present disclosure, a beam with a minimum BER and/or a minimum BLER in a plurality of first OAM beams is determined as the target transmitting beam.

At step 404, a plurality of second OAM transmitting beams are transmitted based on the OAM transmission direction.

It should be noted that the sender can, after determining the OAM beam transmission direction based on the received beam information, transmit a plurality of second OAM transmitting beams based on the OAM beam transmission direction, and the receiver can receive the plurality of second OAM transmitting beams based on different reception directions to obtain a plurality of second OAM reception beams, and then based on reception information of the plurality of second OAM reception beams, determine a reception direction of an OAM system.

In an embodiment of the present disclosure, the sender can sequentially transmit a plurality of second OAM transmitting beams based on a plurality of transmitting directions. In another embodiment of the present disclosure, the sender may not sequentially transmit a plurality of second OAM transmitting beams based on a plurality of transmitting directions, but ensure that the plurality of second OAM transmitting beams can cover the plurality of reception directions of the receiver. In other words, no specific sequence and consistency are required for the operation of transmitting a plurality of second OAM transmitting beams as long as it is guaranteed that the second OAM transmitting beam is received in each direction of the plurality of reception directions of the receiver.

It should be noted that, in an embodiment of the present disclosure, before the sender sends an OAM beam each time, the method shown in FIG. 4 can be implemented such that each time the sender sends an OAM beam, a corresponding OAM beam transmission direction can be determined.

In the method of determining an OAM beam transmission direction according to the embodiments of the present disclosure, the sender determines a plurality of transmitting directions, and then based on the plurality of transmitting directions, sequentially transmits a plurality of first OAM beams to the receiver, and then receives beam information from the receiver, and then based on the beam information, determines the OAM beam transmission direction. Thus, in the embodiments of the present disclosure, an effective OAM beam transmission direction can be determined simply based on the plurality of determined transmitting directions, without obtaining the deflection state of the transceiver array. Hence, in spite of the deflection state of the transceiver array being unknown, the OAM communication can still be implemented, which avoids the problems of a large error resulting from the need to know the deflection state of the transceiver array and high costs, and effectively solves the technical problems of the OAM communication under non-alignment conditions, leading to a good communication effect.

Furthermore, in the embodiments of the present disclosure, before the sender sends an OAM beam each time, the method provided by the embodiments of the present disclosure is carried out, and thus, in spite of the sender being in a motion state, each time the sender sends an OAM beam, the sender can firstly determine an effective OAM beam transmission direction and then based on the OAM beam transmission direction, send the OAM beam to achieve communication. As a result, the method provided by the embodiments of the present disclosure can also be applied to mobile communication scenarios, bringing a wide application scope.

FIG. 5 is a flowchart illustrating a method of determining an OAM beam transmission direction according to an embodiment of the present disclosure, which is performed by a receiver. As shown in FIG. 5, the method of determining an OAM beam transmission direction can include the following steps 501-503.

At step 501, a plurality of first OAM beams transmitted by a sender are received.

In an embodiment of the present disclosure, the receiver in the embodiment of the present disclosure can be any UE or any access network device (e.g., base station). It is noted that when the sender is a UE, the receiver can be a base station; when the sender is a base station, the receiver can be a UE.

The receiver receives the plurality of first OAM beams based on a fixed direction.

At step 502, based on a detection result associated with the plurality of first OAM beams, a target transmitting beam is determined from the plurality of first OAM beams.

In an embodiment of the present disclosure, the receiver can determine a beam with an optimal signal quality in a plurality of first OAM reception beams as a target reception beam based on signal qualities of a plurality of first OAM beams.

In an embodiment of the present disclosure, the receiver can select the target transmitting beam from a plurality of first OAM beams based on RSRQ and/or RSRP. In an embodiment of the present disclosure, a beam with a maximum RSRQ and/or a maximum RSRP in a plurality of first OAM beams is determined as the target transmitting beam by the receiver.

In an embodiment of the present disclosure, the receiver can select the target transmitting beam from a plurality of first OAM beams based on BER and/or BLER. In an embodiment of the present disclosure, a beam with a minimum BER and/or a minimum BLER in a plurality of first OAM beams is determined as the target transmitting beam by the receiver.

At step 503, beam information of the target transmitting beam is sent to the sender, such that the sender determines an OAM beam transmission direction based on the beam information.

In an embodiment of the present disclosure, the beam information of the target transmitting beam can include, but not be limited to, a transmitting azimuth angle and/or transmitting elevation angle of the target transmitting beam.

In the method of determining an OAM beam transmission direction according to the embodiments of the present disclosure, the sender determines a plurality of transmitting directions, and then based on the plurality of transmitting directions, sequentially transmits a plurality of first OAM beams to the receiver, and then receives beam information from the receiver, and then based on the beam information, determines the OAM beam transmission direction. Thus, in the embodiments of the present disclosure, an effective OAM beam transmission direction can be determined simply based on the plurality of determined transmitting directions, without obtaining the deflection state of the transceiver array. Hence, in spite of the deflection state of the transceiver array being unknown, the OAM communication can still be implemented, which avoids the problems of a large error resulting from the need to know the deflection state of the transceiver array and high costs, and effectively solves the technical problems of the OAM communication under non-alignment conditions, leading to a good communication effect.

Furthermore, in the embodiments of the present disclosure, before the sender sends an OAM beam each time, the method provided by the embodiments of the present disclosure is carried out, and thus, in spite of the sender being in a motion state, each time the sender sends an OAM beam, the sender can firstly determine an effective OAM beam transmission direction and then based on the OAM beam transmission direction, send the OAM beam to achieve communication. As a result, the method provided by the embodiments of the present disclosure can also be applied to mobile communication scenarios, bringing a wide application scope.

FIG. 6 is a flowchart illustrating a method of determining an OAM beam transmission direction according to an embodiment of the present disclosure, which is performed by a receiver. As shown in FIG. 6, the method of determining an OAM beam transmission direction can include the following steps 601-607.

At step 601, a plurality of first OAM beams transmitted by a sender are received.

In an embodiment of the present disclosure, the receiver in the embodiment of the present disclosure can be any UE or any access network device (e.g., base station). It is noted that when the sender is a UE, the receiver can be a base station; when the sender is a base station, the receiver can be a UE.

The receiver receives the plurality of first OAM beams based on a fixed direction.

At step 602, based on a detection result associated with the plurality of first OAM beams, a target transmitting beam is determined from the plurality of first OAM beams.

In an embodiment of the present disclosure, the receiver can select the target transmitting beam from a plurality of first OAM beams based on RSRQ and/or RSRP. In an embodiment of the present disclosure, an OAM beam with a maximum RSRQ and/or a maximum RSRP in a plurality of first OAM beams is determined as the target transmitting beam by the receiver.

In an embodiment of the present disclosure, the receiver can select the target transmitting beam from a plurality of first OAM beams based on BER and/or BLER. In an embodiment of the present disclosure, an OAM beam with a minimum BER and/or a minimum BLER in a plurality of first OAM beams is determined as the target transmitting beam by the receiver.

At step 603, beam information of the target transmitting beam is sent to the sender, such that the sender determines an OAM beam transmission direction based on the beam information. At step 604, a plurality of reception directions are determined.

In an embodiment of the present disclosure, the receiver can, after sending the beam information to the sender, determine a plurality of reception directions used to subsequently receive a plurality of second OAM transmitting beams sent by the sender based on the OAM beam transmission direction to obtain a plurality of second OAM reception beams, and based on a detection result associated with the plurality of second OAM reception beams, select a target reception beam from a plurality of second OAM reception beams, and take a reception direction corresponding to the target reception beam as a reception direction of the OAM system.

The plurality of reception directions can be generated based on reception azimuth angles and/or reception elevation angles, where the reception azimuth angle can be an included angle between a projection of a second OAM reception beam axis on a Uniform Circular Array (UCA) surface of the receiver and a coordinate axis of a UCA of the receiver; and the reception elevation angle is an included angle between the second OAM reception beam axis and a UCA plane normal of the receiver.

The coordinate axis of the UCA of the receiver can be any coordinate axis in a coordinate system established on the UCA of the receiver. In an embodiment of the present disclosure, the coordinate system established on the UCA of the receiver can be a coordinate system established with the circle center of the UCA of the receiver as an origin and with the plane where the UCA of the receiver is located as an XOY plane.

At step 605, a plurality of second OAM transmission beams are received based on the plurality of reception directions, respectively, to obtain a plurality of second OAM reception beams.

It is to be noted that in an embodiment of the present disclosure, when the receiver receives a plurality of second OAM reception beams, the sender, all the time, transmits a plurality of second OAM transmitting beams based on the OAM beam transmission direction.

At step 606, a target reception beam is determined from the plurality of second OAM reception beams based on a detection result associated with the plurality of second OAM reception beams.

In an embodiment of the present disclosure, the receiver can determine a beam with an optimal signal quality in a plurality of second OAM reception beams as a target reception beam based on the signal qualities of the plurality of second OAM beams.

In an embodiment of the present disclosure, the receiver can select the target reception beam from a plurality of second OAM reception beams based on RSRQ and/or RSRP. In an embodiment of the present disclosure, a beam with a maximum RSRQ and/or a maximum RSRP in a plurality of second OAM reception beams is determined as the target reception beam by the receiver.

In an embodiment of the present disclosure, the receiver can select the target reception beam from a plurality of second OAM reception beams based on BER and/or BLER. In an embodiment of the present disclosure, a beam with a minimum BER and/or a minimum BLER in a plurality of second OAM reception beams is determined as the target reception beam.

At step 607, a reception direction corresponding to the target reception beam is determined as an OAM beam reception direction.

In an embodiment of the present disclosure, when the OAM beam reception direction is determined, the OAM beam reception direction and the OAM beam transmission direction can be further matched and stored, and thus, when the sender transmits a beam based on the OAM beam transmission direction again, the receiver can receive the beam by directly using the OAM beam reception direction based on the prestored matching relationship.

In an embodiment of the present disclosure, when the target reception beam is determined, beam information of the target reception beam can also be stored. The beam information of the target reception beam can include, but not be limited to, a reception azimuth angle and a reception elevation angle of the target reception beam. Then, the beam information of the target reception beam and the beam information of the target transmitting beam are matched and stored. Thus, when the sender transmits a beam based on the beam information of the target reception beam, subsequently, the receiver can receive the beam by directly using the beam information of the target reception beam based on the prestored matching relationship.

In the method of determining an OAM beam transmission direction according to the embodiments of the present disclosure, the sender determines a plurality of transmitting directions, and then based on the plurality of transmitting directions, sequentially transmits a plurality of first OAM beams to the receiver, and then receives beam information from the receiver, and then based on the beam information, determines the OAM beam transmission direction. Thus, in the embodiments of the present disclosure, an effective OAM beam transmission direction can be determined simply based on the plurality of determined transmitting directions, without obtaining the deflection state of the transceiver array. Hence, in spite of the deflection state of the transceiver array being unknown, the OAM communication can still be implemented, which avoids the problems of a large error resulting from the need to know the deflection state of the transceiver array and high costs, and effectively solves the technical problems of the OAM communication under non-alignment conditions, leading to a good communication effect.

Furthermore, in the embodiments of the present disclosure, before the sender sends an OAM beam each time, the method provided by the embodiments of the present disclosure is carried out, and thus, in spite of the sender being in a motion state, each time the sender sends an OAM beam, the sender can firstly determine an effective OAM beam transmission direction, and then based on the OAM beam transmission direction, send the OAM beam to achieve communication. As a result, the method provided by the embodiments of the present disclosure can also be applied to mobile communication scenarios, bringing a wide application scope.

Figure 7:
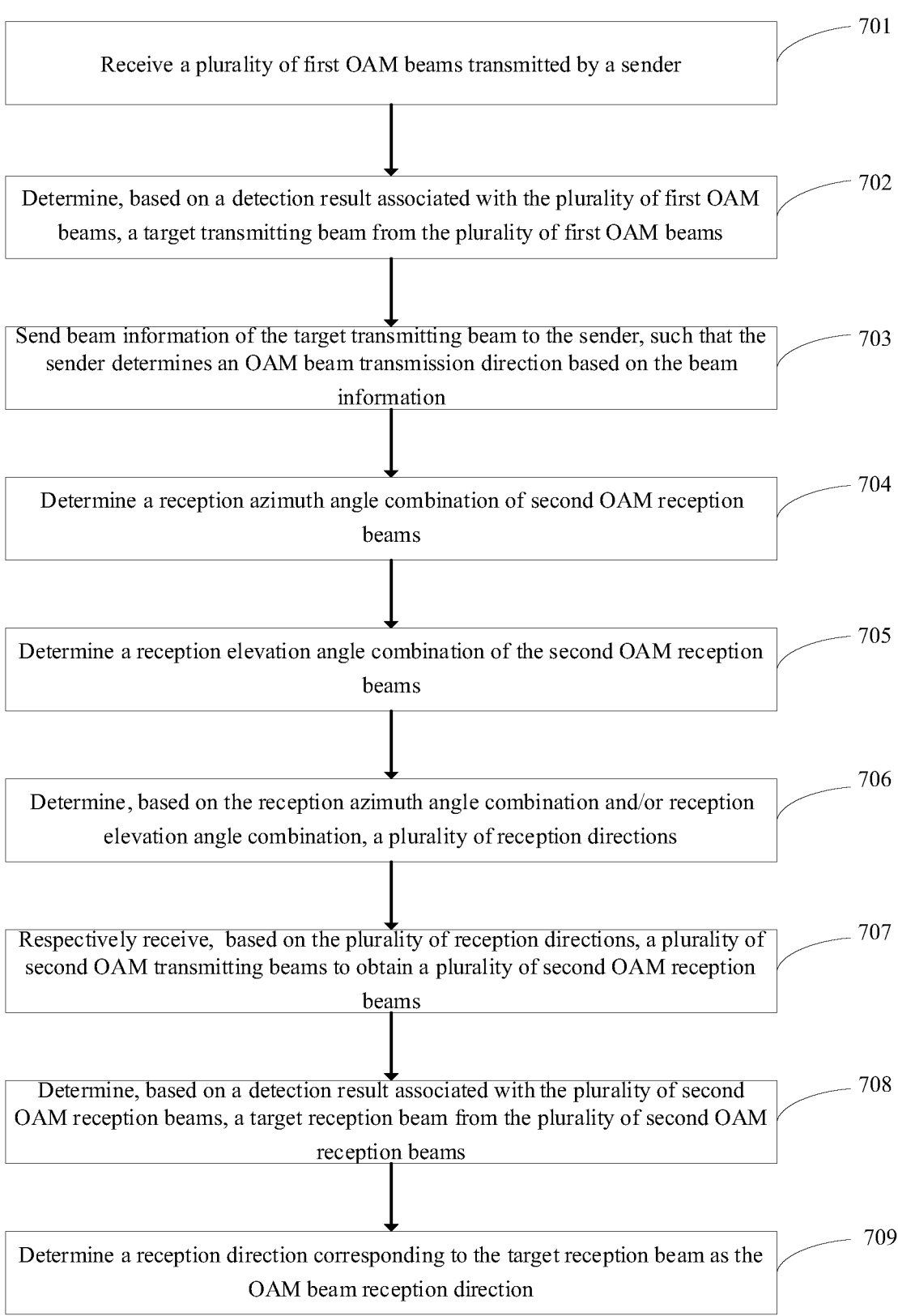
FIG. 7 is a flowchart illustrating a method of determining an OAM beam transmission direction according to another embodiment of the present disclosure.

FIG. 7 is a flowchart illustrating a method of determining an OAM beam transmission direction according to an embodiment of the present disclosure, which is performed by a receiver. As shown in FIG. 7, the method of determining an OAM beam transmission direction can include the following steps 701-709.

At step 701, a plurality of first OAM beams transmitted by a sender are received.

In an embodiment of the present disclosure, the receiver in the embodiment of the present disclosure can be any UE or any access network device (e.g., base station). It is noted that when the sender is a UE, the receiver can be a base station; when the sender is a base station, the receiver can be a UE.

The receiver receives the plurality of first OAM beams based on a fixed direction.

At step 702, based on a detection result associated with the plurality of first OAM beams, a target transmitting beam is determined from the plurality of first OAM beams.

In an embodiment of the present disclosure, the receiver can determine a beam with an optimal signal quality in a plurality of first OAM reception beams as a target reception beam based on the signal qualities of the plurality of first OAM beams.

In an embodiment of the present disclosure, the receiver can select the target transmitting beam from a plurality of first OAM beams based on RSRQ and/or RSRP. In an embodiment of the present disclosure, an OAM beam with a maximum RSRQ and/or a maximum RSRP in a plurality of first OAM beams is determined as the target transmitting beam by the receiver.

In an embodiment of the present disclosure, the receiver can select the target transmitting beam from a plurality of first OAM beams based on BER and/or BLER. In an embodiment of the present disclosure, an OAM beam with a minimum BER and/or a minimum BLER in a plurality of first OAM beams is determined as the target transmitting beam by the receiver.

At step 703, beam information of the target transmitting beam is sent to the sender, such that the sender determines an OAM beam transmission direction based on the beam information.

In an embodiment of the present disclosure, the beam information of the target transmitting beam can include, but not be limited to, a reception azimuth angle and a reception elevation angle of the target transmitting beam.

At step 704, a reception azimuth angle combination of the second OAM reception beams is determined.

The reception azimuth angle combination includes a plurality of reception azimuth angles, one of which is an included angle between a projection of a second OAM reception beam axis on a Uniform Circular Array (UCA) surface of the receiver and a coordinate axis of a UCA of the receiver.

The coordinate axis of the UCA of the receiver can be any coordinate axis in a coordinate system established on the UCA of the receiver. The manner of establishing the coordinate system can include: establishing the coordinate system with a circle center of the UCA of the receiver as origin and with the plane where the UCA of the receiver is located as an XOY plane.

In an embodiment of the present disclosure, the reception azimuth angle combination can be:

$$\left\{ \frac{2\pi \times m}{M_2}, (m = 0, 1, 2 \ldots M_2) \right\};$$

where M2 is an integer used to indicate a number of the reception azimuth angles in the reception azimuth angle combination.

At step 705, a reception elevation angle combination of the second OAM reception beams is determined.

The reception elevation angle combination includes a plurality of reception elevation angles, one of which is an included angle between the second OAM reception beam axis and a UCA plane normal of the receiver.

In an embodiment of the present disclosure, the reception elevation angle combination can be:

$$\left\{ \frac{\pi \times n}{N_2}, \left(n = 0, 1, 2 \ldots \frac{N_2}{2}\right) \right\};$$

where N2 is an integer used to indicate a number of reception elevation angles in the reception elevation angle combination.

At step 706, based on the reception azimuth angle combination and/or reception elevation angle combination, a plurality of reception directions are determined.

In an embodiment of the present disclosure, the receiver can determine one reception direction based on any reception azimuth angle of the reception azimuth angle combination and/or any reception elevation angle of the reception elevation angle combination. Thus, a plurality of reception directions can be generated by traversing all reception azimuth angles of the reception azimuth angle combination and/or all reception elevation angles of the reception elevation angle combination.

It should be noted that the larger the M2 and N2 are, the more the reception azimuth angles of the reception azimuth angle combination and the reception elevation angles of the reception elevation angle combination are. Hence, more reception directions can be determined based on the reception azimuth angle combination and/or the reception elevation angle combination, and it is more probable that the OAM beam reception direction finally determined is an optimal reception direction, thereby improving the accuracy of determining an OAM beam reception direction.

At step 707, based on the plurality of reception directions, a plurality of second OAM transmitting beams are received respectively to obtain a plurality of second OAM reception beams.

In an embodiment of the present disclosure, when the receiver receives a plurality of second OAM reception beams, the sender, all the time, sends a plurality of second OAM transmitting beams based on the OAM beam transmission direction.

At step 708, based on a detection result associated with the plurality of second OAM reception beams, a target reception beam is determined from the plurality of second OAM reception beams.

In an embodiment of the present disclosure, the receiver can determine a beam with an optimal signal quality in a plurality of second OAM reception beams as the target reception beam based on the signal qualities of the plurality of second OAM reception beams.

In an embodiment of the present disclosure, the receiver can select the target reception beam from a plurality of second OAM reception beams based on RSRQ and/or RSRP. In an embodiment of the present disclosure, a beam with a maximum RSRQ and/or a maximum RSRP in a plurality of second OAM reception beams is determined as the target reception beam by the receiver.

In an embodiment of the present disclosure, the receiver can select the target reception beam from a plurality of second OAM reception beams based on BER and/or BLER. In an embodiment of the present disclosure, a beam with a minimum BER and/or a minimum BLER in a plurality of second OAM reception beams is determined as the target reception beam by the receiver.

At step 709, a reception direction corresponding to the target reception beam is determined as the OAM beam reception direction.

In an embodiment of the present disclosure, when the OAM beam reception direction is determined, the OAM beam reception direction and the OAM beam transmission direction can be further matched and stored. Thus, when the sender transmits a beam based on the OAM beam transmission direction again, the receiver can receive the beam by directly using the OAM beam reception direction based on the prestored matching relationship.

In an embodiment of the present disclosure, when the target reception beam is determined, beam information of the target reception beam can also be stored. The beam information of the target reception beam can include, but not be limited to, a reception azimuth angle and a reception elevation angle of the target reception beam. Then, the beam information of the target reception beam and the beam information of the target transmitting beam are matched and stored. Thus, when the sender transmits a beam based on the beam information of the target reception beam subsequently, the receiver can receive the beam by directly using the beam information of the target reception beam based on the prestored matching relationship.

In the method of determining an OAM beam transmission direction according to the embodiments of the present disclosure, the sender determines a plurality of transmitting directions, and then based on the plurality of transmitting directions, sequentially transmits a plurality of first OAM beams to the receiver, and then receives beam information from the receiver, and then based on the beam information, determines the OAM beam transmission direction. Thus, in the embodiments of the present disclosure, an effective OAM beam transmission direction can be determined simply based on the plurality of determined transmitting directions, without obtaining the deflection state of the transceiver array. Hence, in spite of the deflection state of the transceiver array being unknown, the OAM communication can still be implemented, which avoids the problems of a large error resulting from the need to know the deflection state of the transceiver array and high costs, and effectively solves the technical problems of the OAM communication under non-alignment conditions, leading to a good communication effect.

Furthermore, in the embodiments of the present disclosure, before the sender sends an OAM beam each time, the method provided by the embodiments of the present disclosure is carried out, and thus, in spite of the sender being in a motion state, each time the sender sends an OAM beam, the sender can firstly determine an effective OAM beam transmission direction and then based on the OAM beam transmission direction, send the OAM beam to achieve communication. As a result, the method provided by the embodiments of the present disclosure can also be applied to mobile communication scenarios, bringing a wide application scope.

Figure 8:
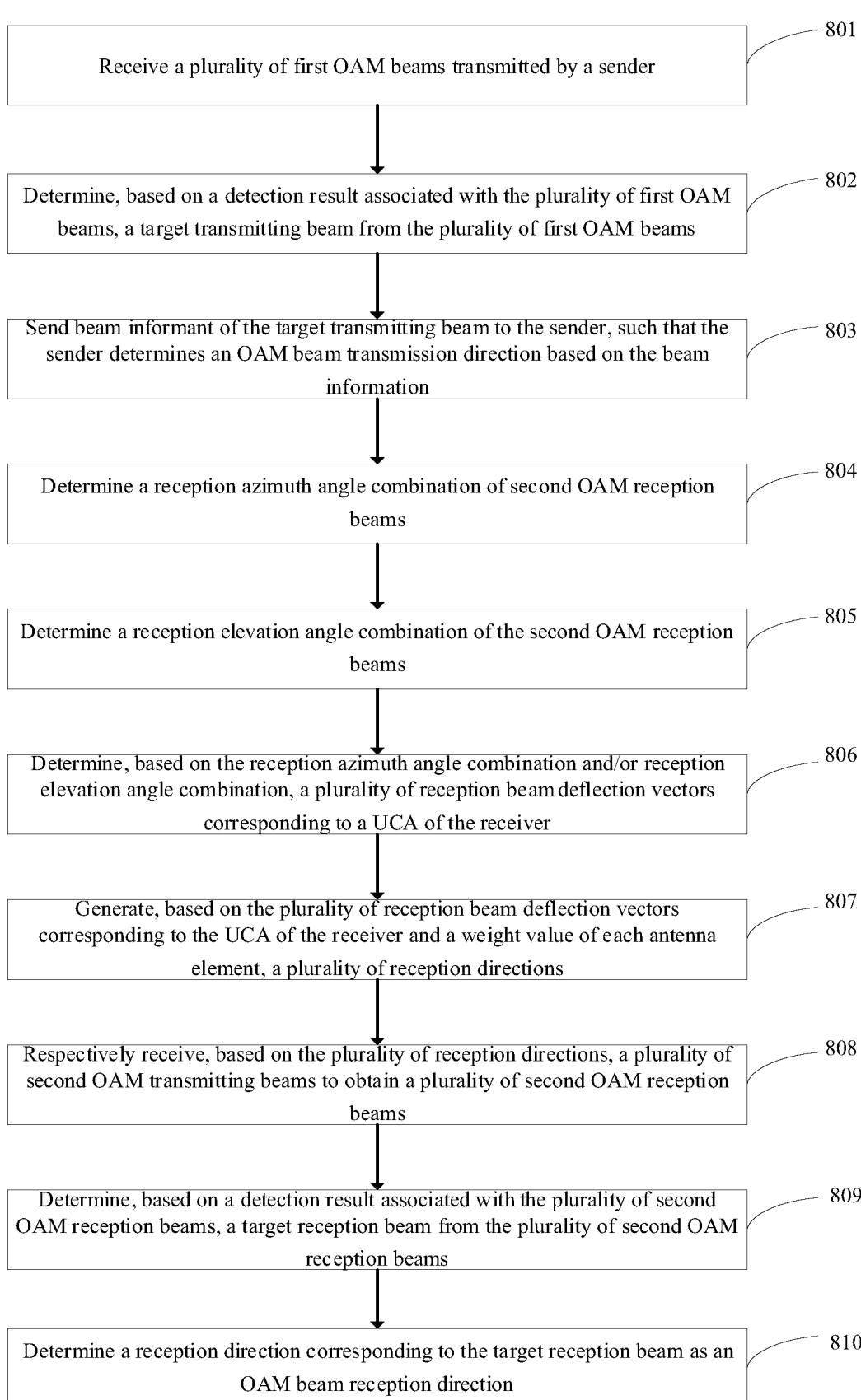
FIG. 8 is a flowchart illustrating a method of determining an OAM beam transmission direction according to another embodiment of the present disclosure.

FIG. 8 is a flowchart illustrating a method of determining an OAM beam transmission direction according to an embodiment of the present disclosure, which is performed by a receiver. As shown in FIG. 8, the method of determining an OAM beam transmission direction can include the following steps 801-810.

At step 801, a plurality of first OAM beams transmitted by a sender are received.

In an embodiment of the present disclosure, the receiver in the embodiment of the present disclosure can be any UE or any access network device (e.g., base station). It is noted that when the sender is a UE, the receiver can be a base station; when the sender is a base station, the receiver can be a UE.

The receiver receives the plurality of first OAM beams based on a fixed direction.

At step 802, based on a detection result associated with the plurality of first OAM beams, a target transmitting beam is determined from the plurality of first OAM beams.

In an embodiment of the present disclosure, the receiver can determine a beam with an optimal signal quality in a plurality of first OAM beams as a target reception beam based on the signal qualities of the plurality of first OAM beams.

In an embodiment of the present disclosure, the receiver can select the target transmitting beam from a plurality of first OAM beams based on RSRQ and/or RSRP. In an embodiment of the present disclosure, a beam with a maximum RSRQ and/or a maximum RSRP in a plurality of first OAM beams is determined as the target transmitting beam.

In an embodiment of the present disclosure, the receiver can select the target transmitting beam from a plurality of first OAM beams based on BER and/or BLER. In an embodiment of the present disclosure, a beam with a minimum BER and/or a minimum BLER in a plurality of first OAM beams is determined as the target transmitting beam by the receiver.

At step 803, the beam informant of the target transmitting beam is sent to the sender, such that the sender determines an OAM beam transmission direction based on the beam information.

In an embodiment of the present disclosure, the beam information of the target transmission beam can include, but not be limited to, a transmitting azimuth angle and/or a transmitting elevation angle of the target transmitting beam.

At step 804, a reception azimuth angle combination of second OAM reception beams is determined.

The reception azimuth angle combination includes a plurality of reception azimuth angles, one of which is an included angle between a projection of a second OAM reception beam axis on a Uniform Circular Array (UCA) surface of the receiver and a coordinate axis of a UCA of the receiver.

The coordinate axis of the UCA of the receiver can be any coordinate axis in a coordinate system established on the UCA surface of the receiver. The manner of establishing the coordinate system can include: establishing the coordinate system with a circle center of the UCA of the receiver as an origin and with the plane where the UCA of the receiver is located as an XOY plane.

In an embodiment of the present disclosure, the reception azimuth angle combination can be:

$$\left\{ \frac{2\pi \times m}{M_2},\ (m = 0, 1, 2 \ \dots \ M_2) \right\};$$

where M2 is an integer used to indicate a number of reception azimuth angles in the reception azimuth angle combination.

At step 805, a reception elevation angle combination of the second OAM reception beams is determined.

The reception elevation angle combination includes a plurality of reception elevation angles, one of which is an included angle between the second OAM reception beam axis and a UCA plane normal of the receiver.

In an embodiment of the present disclosure, the reception elevation angle combination can be:

$$\left\{ \frac{\pi \times n}{N_2},\ \left( n = 0, 1, 2 \ \dots \ \frac{N_2}{2} \right) \right\};$$

where N2 is an integer used to indicate a number of reception elevation angles in the reception elevation angle combination.

At step 806, based on the reception azimuth angle combination and/or reception elevation angle combination, a plurality of reception beam deflection vectors corresponding to a UCA of the receiver are determined.

In an embodiment of the present disclosure, when the reception azimuth angle and/or the reception elevation angle is different, the reception beam deflection vector corresponding to the UCA of the receiver is also different. The reception beam deflection vectors corresponding to the UCA of the receiver include a reception beam deflection vector corresponding to each antenna element in the UCA of the receiver, and the reception beam deflection vectors corresponding to respective antenna elements in the UCA of the receiver are different.

The reception beam deflection vector $W_{2(m,n)}$ corresponding to an i-th antenna element is:

$$W_{2(m,n)} = e^{j\frac{2\pi}{\lambda} R_{r2} \cos\left(\varphi_{m2} + \frac{2\pi i}{K}\right) \sin(\theta_{n2})};$$

where $\lambda$ represents a wavelength of the second OAM reception beam, $R_{r2}$ represents a radius of the UCA of the receiver, $\varphi_{m2}$ represents any one azimuth angle of the reception azimuth angle combination, $\theta_{n2}$ represents any elevation angle of the reception elevation angle combination, j is a complex number, and K is an integer used to indicate the number of the UCA antenna elements of the receiver.

By traversing all reception azimuth angles of the reception azimuth angle combination and/or all reception elevation angles of the reception elevation angle combination, a plurality of reception beam deflection vectors corresponding to the UCA of the receiver are determined.

At step 807, based on the plurality of reception beam deflection vectors corresponding to the UCA of the receiver and a weight value of each antenna element, a plurality of reception directions are generated.

In an embodiment of the present disclosure, each antenna element corresponds to one weight value a: $a = e^{jl\phi}$;

where l represents a modal of the OAM, $\varphi$ represents an included angle between a projection of the antenna element on the UCA surface of the receiver and the coordinate axis of the UCA of the receiver, and j is a complex number.

In an embodiment of the present disclosure, based on the plurality of reception beam deflection vectors corresponding to the UCA of the receiver and the weight value of each antenna element, generating the plurality of reception directions includes: for each antenna element in the reception beam deflection vectors corresponding to the UCA of the receiver, based on a product of the reception beam deflection vector corresponding to the antenna element and the weight value of the antenna element, generating a reception direction; by traversing the plurality of reception beam deflection vectors corresponding to the UCA of the receiver, determining the plurality of reception directions.

At step 808, based on the plurality of reception directions, a plurality of second OAM transmitting beams are received respectively to obtain a plurality of second OAM reception beams.

It is to be noted that in an embodiment of the present disclosure, when the receiver receives a plurality of second OAM reception beams, the sender, all the time, transmits a plurality of second OAM transmitting beams based on the OAM beam transmission direction.

At step 809, based on a detection result associated with the plurality of second OAM reception beams, a target reception beam is determined from the plurality of second OAM reception beams.

In an embodiment of the present disclosure, the receiver can determine a beam with an optimal signal quality in a plurality of second OAM reception beams as a target reception beam based on the signal qualities of the plurality of second OAM reception beams.

In an embodiment of the present disclosure, the receiver can select the target reception beam from a plurality of second OAM reception beams based on RSRQ and/or RSRP. In an embodiment of the present disclosure, a beam with a maximum RSRQ and/or a maximum RSRP in a plurality of second OAM reception beams is determined as the target reception beam by the receiver.

In an embodiment of the present disclosure, the receiver can select the target reception beam from a plurality of second OAM reception beams based on BER and/or BLER. In an embodiment of the present disclosure, a beam with a minimum BER and/or a minimum BLER in a plurality of second OAM reception beams is determined as the target reception beam by the receiver.

At step 810, a reception direction corresponding to the target reception beam is determined as an OAM beam reception direction.

In an embodiment of the present disclosure, when the OAM beam reception direction is determined, the OAM beam reception direction and the OAM beam transmission direction can be further matched and stored. Thus, when the sender transmits a beam based on the OAM beam transmission direction again, the receiver can receive the beam by directly using the OAM beam reception direction based on the prestored matching relationship.

In an embodiment of the present disclosure, when the target reception beam is determined, beam information of the target reception beam can also be stored. The beam information of the target reception beam can include, but not be limited to, a reception azimuth angle, a reception elevation angle, and a reception beam deflection vector of the target reception beam. Then, the beam information of the target reception beam and the beam information of the target transmitting beam are matched and stored, and thus, when the sender transmits a beam based on the beam information of the target reception beam subsequently, the receiver can receive the beam by directly using the beam information of the target reception beam based on the prestored matching relationship.

In the method of determining an OAM beam transmission direction according to the embodiments of the present disclosure, the sender determines a plurality of transmitting directions, and then based on the plurality of transmitting directions, sequentially transmits a plurality of first OAM beams to the receiver, and then receives beam information sent by the receiver, and then based on the beam information, determines the OAM beam transmission direction. Thus, in the embodiments of the present disclosure, an effective OAM beam transmission direction can be determined simply based on the plurality of determined transmitting directions, without obtaining the deflection state of the transceiver array. Hence, in spite of the deflection state of the transceiver array being unknown, the OAM communication can still be implemented, which avoids the problems of a large error resulting from the need to know the deflection state of the transceiver array and high costs. This effectively solves the technical problems of the OAM communication under non-alignment conditions, leading to a good communication effect.

Furthermore, in the embodiments of the present disclosure, before the sender sends an OAM beam each time, the method provided by the embodiments of the present disclosure is carried out. Thus, in spite of the sender being in a motion state, each time the sender sends an OAM beam, the sender can firstly determine an effective OAM beam transmission direction and then, based on the OAM beam transmission direction, send the OAM beam to achieve communication. As a result, the method provided by the embodiments of the present disclosure can also be applied to mobile communication scenarios, bringing a wide application scope.

Figure 9:
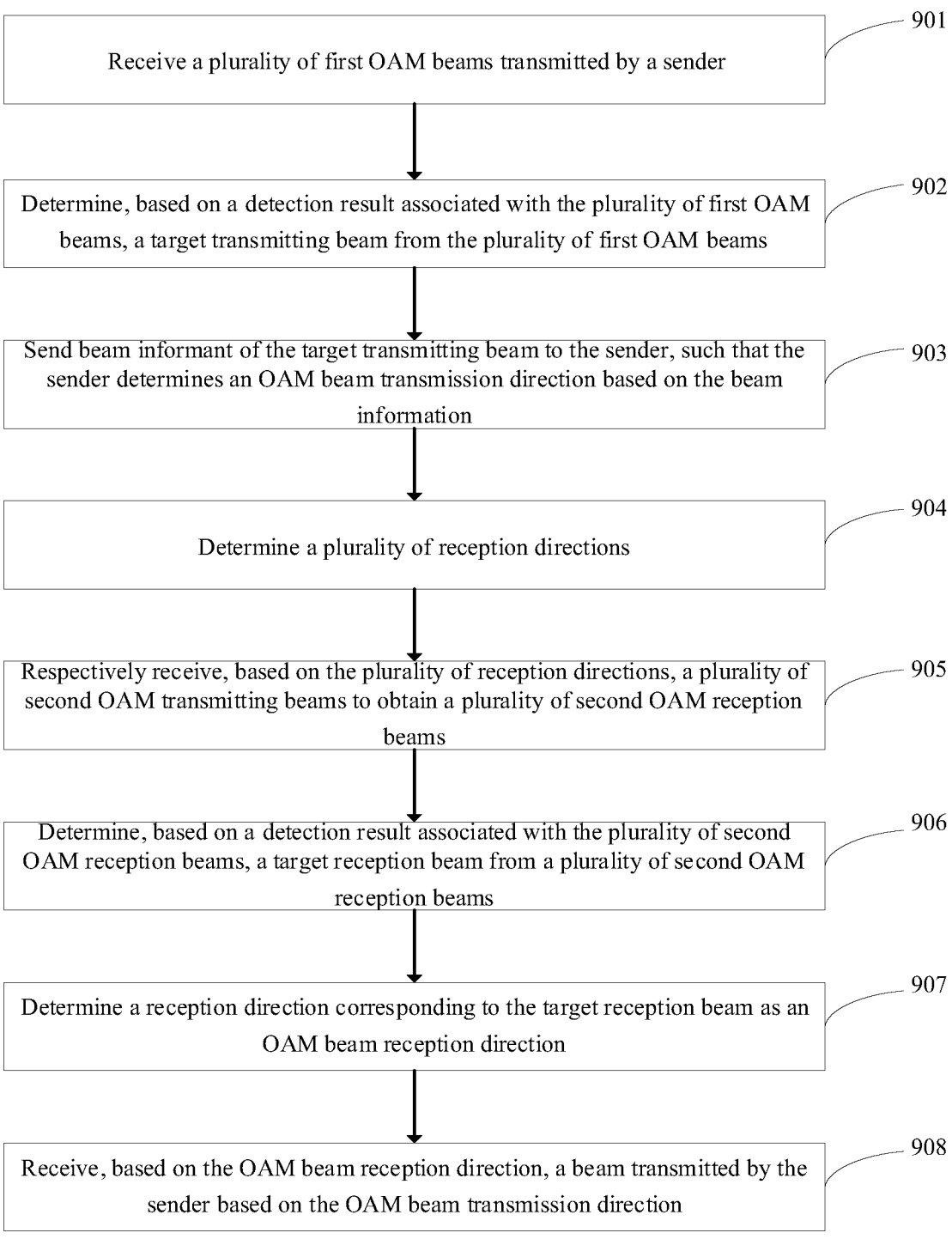
FIG. 9 is a flowchart illustrating a method of determining an OAM beam transmission direction according to another embodiment of the present disclosure.

FIG. 9 is a flowchart illustrating a method of determining an OAM beam transmission direction according to an embodiment of the present disclosure, which is performed by a receiver. As shown in FIG. 9, the method of determining an OAM beam transmission direction can include the following steps 901-908.

At step 901, a plurality of first OAM beams transmitted by a sender are received.

It is noted that the receiver in the embodiment of the present disclosure can be any UE or any access network device (e.g., base station).

The receiver receives the plurality of first OAM beams based on a fixed direction.

At step 902, based on a detection result associated with the plurality of first OAM beams, a target transmitting beam is determined from the plurality of first OAM beams.

In an embodiment of the present disclosure, the receiver can determine a beam with an optimal signal quality in a plurality of first OAM reception beams as a target reception beam based on the signal qualities of the plurality of first OAM beams.

In an embodiment of the present disclosure, the receiver can select the target transmitting beam from a plurality of first OAM beams based on RSRQ and/or RSRP. In an embodiment of the present disclosure, an OAM beam with a maximum RSRQ and/or a maximum RSRP in a plurality of first OAM beams is determined as the target transmitting beam by the receiver.

In an embodiment of the present disclosure, the receiver can select the target transmitting beam from a plurality of first OAM beams based on BER and/or BLER. In an embodiment of the present disclosure, an OAM beam with a minimum BER and/or a minimum BLER in a plurality of first OAM beams is determined as the target transmitting beam by the receiver.

At step 903, the beam informant of the target transmitting beam is sent to the sender, such that the sender determines an OAM beam transmission direction based on the beam information.

In an embodiment of the present disclosure, the beam information of the target transmitting beam can include, but not be limited to, a transmitting azimuth angle and a transmitting elevation angle of the target transmission beam.

At step 904, a plurality of reception directions are determined.

In an embodiment of the present disclosure, the receiver can, after sending the beam information to the sender, determine a plurality of reception directions used to subsequently receive a plurality of second OAM transmitting beams transmitted by the sender based on the OAM beam transmission direction to obtain a plurality of second OAM reception beams, and based on the plurality of received second OAM reception beams, determine an optimal reception direction from the plurality of reception directions as a reception direction of the OAM system.

The plurality of reception directions can be generated based on reception azimuth angles and/or reception elevation angles, where the reception azimuth angle can be an included angle between a projection of a second OAM reception beam axis on a Uniform Circular Array (UCA) surface of the receiver and a coordinate axis of a UCA of the receiver; and the reception elevation angle is an included angle between the second OAM reception beam axis and a UCA plane normal of the receiver.

The coordinate axis of the UCA of the receiver can be any coordinate axis in a coordinate system established on the UCA of the receiver. In an embodiment of the present disclosure, the coordinate system established on the UCA of the receiver can be a coordinate system established with a circle center of the UCA of the receiver as an origin and with the plane where the UCA of the receiver is located as an XOY plane.

At step 905, based on the plurality of reception directions, a plurality of second OAM transmitting beams are received respectively to obtain a plurality of second OAM reception beams.

It is noted that in an embodiment of the present disclosure, when the receiver receives a plurality of second OAM reception beams, the sender, all the time, transmits a plurality of second OAM transmitting beams based on the OAM beam transmission direction.

At step 906, based on a detection result associated with the plurality of second OAM reception beams, a target reception beam is determined from a plurality of second OAM reception beams.

In an embodiment of the present disclosure, the receiver can determine a beam with an optimal signal quality in a plurality of second OAM reception beams as a target reception beam based on the signal qualities of the plurality of second OAM reception beams.

In an embodiment of the present disclosure, the receiver can select the target reception beam from a plurality of second OAM reception beams based on RSRQ and/or RSRP. In an embodiment of the present disclosure, a beam with a maximum RSRQ and/or a maximum RSRP in a plurality of second OAM reception beams is determined as the target reception beam by the receiver.

In an embodiment of the present disclosure, the receiver can select the target reception beam from a plurality of second OAM reception beams based on BER and/or BLER. In an embodiment of the present disclosure, a beam with a minimum BER and/or a minimum BLER in a plurality of second OAM reception beams is determined as the target reception beam by the receiver.

At step 907, a reception direction corresponding to the target reception beam is determined as an OAM beam reception direction.

At step 908, based on the OAM beam reception direction, a beam transmitted by the sender based on the OAM beam transmission direction is received.

In the method of determining an OAM beam transmission direction according to the embodiments of the present disclosure, the sender determines a plurality of transmitting directions, and then based on the plurality of transmitting directions, sequentially transmits a plurality of first OAM beams to the receiver, and then receives beam information from the receiver, and then based on the beam information, determines the OAM beam transmission direction. Thus, in the embodiments of the present disclosure, an effective OAM beam transmission direction can be determined simply based on the plurality of determined transmitting directions, without obtaining the deflection state of the transceiver array. Hence, in spite of the deflection state of the transceiver array being unknown, the OAM communication can still be implemented. This avoids the problems of a large error resulting from the need to know the deflection state of the transceiver array and high costs, and effectively solves the technical problems of the OAM communication under non-alignment conditions, leading to a good communication effect.

Furthermore, in the embodiments of the present disclosure, before the sender sends an OAM beam each time, the method provided by the embodiments of the present disclosure is carried out, and thus, in spite of the sender being in a motion state, each time the sender sends an OAM beam, the sender can firstly determine an effective OAM beam transmission direction, and then based on the OAM beam transmission direction, send the OAM beam to achieve communication. As a result, the method provided by the embodiments of the present disclosure can also be applied to mobile communication scenarios, bringing wide application scope.

Furthermore, in the embodiments of the present disclosure, when the OAM beam reception direction is determined, the receiver only needs to determine a plurality of reception directions, and respectively receives a plurality of second OAM transmitting beams transmitted by the sender based on the plurality of reception directions to obtain a plurality of second OAM reception beams, and based on the signal qualities of the plurality of second OAM reception beams, determines the OAM beam reception direction. In the embodiments of the present disclosure, an effective OAM beam reception direction can be determined simply based on the plurality of determined reception directions, without obtaining the deflection state of the transceiver array, and thus in spite of the deflection state of the transceiver array being unknown, the OAM communication can still be implemented. This avoids the problems of a large error resulting from the need to know the deflection state of the transceiver array and high costs, and effectively solves the technical problems of the OAM communication under non-alignment conditions, leading to a good communication effect.

Figures 10, 11:
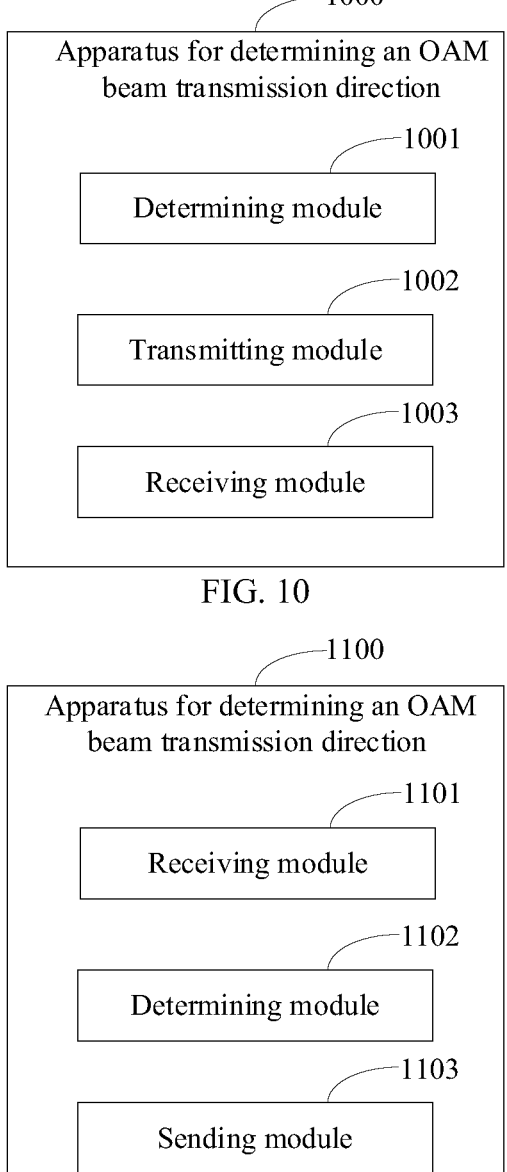
FIG. 10 is a structural schematic diagram illustrating an apparatus for determining an OAM beam transmission direction according to an embodiment of the present disclosure.
FIG. 11 is a structural schematic diagram illustrating an apparatus for determining an OAM beam transmission direction according to an embodiment of the present disclosure.

FIG. 10 is a structural schematic diagram illustrating an apparatus for determining an OAM beam transmission direction 1000 according to an embodiment of the present disclosure. As shown in FIG. 10, the apparatus 1000 can include a determining module 1001, a transmitting module 1002, and a receiving module 1003.

The determining module 1001 is configured to determine a plurality of transmitting directions.

The transmitting module 1002 is configured to transmit, based on the plurality of transmitting directions, a plurality of first OAM beams to a receiver.

The receiving module 1003 is configured to receive beam information from the receiver and determine, based on the beam information, an OAM beam transmission direction.

In the apparatus for determining an OAM beam transmission direction according to the embodiments of the present disclosure, the sender determines a plurality of transmitting directions, and then based on the plurality of transmitting directions, transmits a plurality of first OAM beams to the receiver, and then receives beam information sent by the receiver, and then based on the beam information, determines the OAM beam transmission direction. Thus, in the embodiments of the present disclosure, an effective OAM beam transmission direction can be determined simply based on the plurality of determined transmitting directions, without obtaining the deflection state of the transceiver array. Hence, in spite of the deflection state of the transceiver array being unknown, the OAM communication can still be implemented. This avoids the problems of a large error resulting from the need to know the deflection state of the transceiver array and high costs, and effectively solves the technical problems of the OAM communication under non-alignment conditions, leading to a good communication effect.

Furthermore, in the embodiments of the present disclosure, before the sender sends an OAM beam each time, the method provided by the embodiments of the present disclosure is carried out. Thus, in spite of the sender being in a motion state, each time the sender sends an OAM beam, the sender can firstly determine an effective OAM beam transmission direction, and then, based on the OAM beam transmission direction, send the OAM beam to achieve communication. As a result, the method provided by the embodiments of the present disclosure can also be applied to mobile communication scenarios, bringing a wide application scope.

In an embodiment of the present disclosure, the determining module 1001 is further configured to: determine a transmitting azimuth angle combination for transmitting the first OAM beams, where the transmitting azimuth angle combination includes a plurality of transmitting azimuth angles, one of which is an included angle between a projection of a first OAM beam axis on a uniform circular array (UCA) surface of the sender and a coordinate axis of a UCA of the sender; determine a transmitting elevation angle combination for transmitting the first OAM beams, where the transmitting elevation angle combination includes a plurality of transmitting elevation angles, one of which is an included angle between the first OAM beam axis and a UCA plane normal of the sender; and based on the transmitting azimuth angle combination and/or the transmitting elevation angle combination, generate the plurality of transmitting directions.

Furthermore, in another embodiment of the present disclosure, the determining module 1001 is further configured to determine the transmitting azimuth angle combination in the following formula: the transmitting azimuth angle combination is:

$$\left\{ \frac{2\pi \times m}{M_1}, (m = 0, 1, 2 \ldots M_1) \right\}.$$

Where M1 is an integer used to indicate a number of the transmitting azimuth angles in the transmitting azimuth angle combination.

Furthermore, in another embodiment of the present disclosure, the determining module 1001 is further configured to determine the transmitting elevation angle combination in the following formula: the transmitting elevation angle combination is:

$$\left\{ \frac{\pi \times n}{N_1}, \left( n = 0, 1, 2 \ldots \frac{N_1}{2} \right) \right\}.$$

Where N1 is an integer used to indicate a number of the transmitting elevation angles in the transmitting elevation angle combination.

Furthermore, in another embodiment of the present disclosure, the determining module 1001 is further configured to: based on the transmitting azimuth angle combination and/or the transmitting elevation angle combination, determine a plurality of transmitting beam deflection vectors corresponding to the UCA of the sender, where the transmitting beam deflection vectors corresponding to the UCA of the sender includes a transmitting beam deflection vector corresponding to each antenna element of the UCA of the sender; and based on the plurality of transmitting beam deflection vectors corresponding to the UCA of the sender and a weight value of each antenna element of the UCA of the sender, generate the plurality of transmitting directions.

Furthermore, in another embodiment of the present disclosure, the determining module 1001 is further configured to: based on any one transmitting azimuth angle of the transmitting azimuth angle combination and/or any one transmitting elevation angle of the transmitting elevation angle combination, determine a transmitting beam deflection vector corresponding to the UCA of the sender; and traverse the transmitting azimuth angles of the transmitting azimuth angle combination and/or the transmitting elevation angles of the transmitting elevation angle combination to generate the plurality of transmitting beam deflection vectors corresponding to the UCA of the sender.

Furthermore, in another embodiment of the present disclosure, the determining module 1001 is further configured to determine the transmitting beam deflection vectors in the following steps: the transmitting beam deflection vector $W_{1(m,n)}$ corresponding to an i-th antenna element is:

$$W_{1(m,n)} = e^{j \frac{2\pi}{\lambda} R_{t1} \cos\left( \varphi_{m1} + \frac{2\pi i}{K} \right) \sin(\theta_{n1})}.$$

Where, $\lambda$ represents a wavelength of the first OAM beam, $R_{t1}$ represents a radius of the UCA of the sender, $\varphi_{m1}$ represents any one transmitting azimuth angle of the transmitting azimuth angle combination, $\theta_{n1}$ represents any one transmitting elevation angle of the transmitting elevation angle combination, j is a complex number, and K is an integer used to indicate the number of the UCA antenna elements of the sender.

Furthermore, in another embodiment of the present disclosure, the weight value a of each antenna element is $a=e^{jl\varphi}$. Where l represents a modal of the OAM, $\varphi$ represents an included angle between a projection of the antenna element on the UCA surface of the sender and the coordinate axis of the UCA of the sender, and j is a complex number.

Furthermore, in another embodiment of the present disclosure, the determining module 1001 is further configured to: for each antenna element of the UCA of the sender included in the transmitting beam deflection vectors corresponding to the UCA of the sender, based on a product of the transmitting beam deflection vector corresponding to the antenna element and the weight value of the antenna element, determine a transmitting direction; and traverse the plurality of transmitting beam deflection vectors corresponding to the UCA of the sender to determine a plurality of transmitting directions.

Furthermore, in another embodiment of the present disclosure, the beam information includes a transmitting azimuth angle and/or a transmitting elevation angle.

Furthermore, in another embodiment of the present disclosure, the apparatus for determining the OAM beam transmission direction is further configured to: after receiving the beam information from the receiver, based on the OAM beam transmission direction, transmit a plurality of second OAM transmitting beams.

FIG. 11 is a structural schematic diagram illustrating an apparatus for determining an OAM beam transmission direction 1100 according to an embodiment of the present disclosure. As shown in FIG. 11, the apparatus 1100 can include a receiving module 1101, a determining module 1102, and a sending module 1103.

The receiving module 1101 is configured to receive a plurality of first OAM beams transmitted by a sender.

The determining module 1102 is configured to determine, based on a detection result associated with the plurality of first OAM beams, a target transmitting beam from the plurality of first OAM beams. The sending module 1103, configured to send beam information of the target transmitting beam to the sender, such that the sender determines the OAM beam transmission direction based on the beam information.

In the apparatus for determining an OAM beam transmission direction according to the embodiments of the present disclosure, the sender determines a plurality of transmitting directions, and then based on the plurality of transmitting directions, sequentially transmits a plurality of first OAM beams to the receiver, and then receives beam information sent by the receiver, and then based on the beam information, determines the OAM beam transmission direction. Thus, in the embodiments of the present disclosure, an effective OAM beam transmission direction can be determined simply based on the plurality of determined transmitting directions, without obtaining the deflection state of the transceiver array. Hence, in spite of the deflection state of the transceiver array being unknown, the OAM communication can still be implemented, which avoids the problems of a large error resulting from the need to know the deflection state of the transceiver array and high costs. This effectively solves the technical problems of the OAM communication under non-alignment conditions, leading to a good communication effect.

Furthermore, in the embodiments of the present disclosure, before the sender sends an OAM beam each time, the method provided by the embodiments of the present disclosure is carried out, and thus, in spite of the sender being in a motion state, each time the sender sends an OAM beam, the sender can firstly determine an effective OAM beam transmission direction, and then based on the OAM beam transmission direction, send the OAM beam to achieve communication. As a result, the method provided by the embodiments of the present disclosure can also be applied to mobile communication scenarios, bringing a wide application scope.

In an embodiment of the present disclosure, the determining module 1102 is further configured to: based on a reference signal reception power (RSRP) and/or reference signal reception quality (RSRQ), select the target transmitting beam from the plurality of first OAM beams.

Furthermore, in an embodiment of the present disclosure, the determining module 1102 is further configured to: based on a bit error rate (BER) and/or block error rate (BLER), select the target transmitting beam from the plurality of first OAM beams.

Furthermore, in another embodiment of the present disclosure, the apparatus for determining the OAM beam transmission direction is further configured to: determine a plurality of reception directions; based on the plurality of reception directions, receive a plurality of second OAM transmitting beams transmitted by the sender to obtain a plurality of second OAM reception beams; based on a detection result associated with the plurality of second OAM beams, determine a target reception beam from the plurality of second OAM reception beams; and determine a reception direction corresponding to the target reception beam as an OAM beam reception direction.

Furthermore, in another embodiment of the present disclosure, the apparatus for determining the OAM beam transmission direction is further configured to: determine a reception azimuth angle combination of the second OAM reception beams, where the reception azimuth angle combination includes a plurality of reception azimuth angles, one of which is an included angle between a projection of a second OAM reception beam axis on a Uniform Circular Array (UCA) surface of the receiver and a coordinate axis of a UCA of the receiver; determine a reception elevation angle combination of the second OAM reception beams, where the reception elevation angle combination includes a plurality of reception elevation angles, one of which is an included angle between the second OAM reception beam axis and a UCA plane normal of the receiver. The apparatus is further configured to: based on the reception azimuth angle combination and/or reception elevation angle combination, determining the plurality of reception directions.

Furthermore, in an embodiment of the present disclosure, the apparatus determines the reception azimuth angle combination in the following formula: the reception azimuth angle combination is:

$$\left\{ \frac{2\pi \times m}{M_2}, (m = 0, 1, 2 \dots M_2) \right\}.$$

Where M2 is an integer used to indicate a number of reception azimuth angles in the reception azimuth angle combination.

Furthermore, in an embodiment of the present disclosure, the apparatus determines the reception elevation angle combination in the following formula: the reception elevation angle combination is:

$$\left\{ \frac{\pi \times n}{N_2}, \left( n = 0, 1, 2 \dots \frac{N_2}{2} \right) \right\}.$$

where N2 is an integer used to indicate a number of reception elevation angles in the reception elevation angle combination.

Furthermore, in another embodiment of the present disclosure, the apparatus for determining the OAM beam transmission direction is further configured to: based on the reception azimuth angle combination and/or reception elevation angle combination, determine a plurality of reception beam deflection vectors corresponding to the UCA of the receiver, where the reception beam deflection vectors corresponding to the UCA of the receiver include a reception beam deflection vector corresponding to each antenna element in the UCA of the receiver; and based on the plurality of reception beam deflection vectors corresponding to the UCA of the receiver and a weight value of each antenna element, determine the plurality of reception directions.

Furthermore, in an embodiment of the present disclosure, the apparatus is further configured to: based on any one azimuth angle of the reception azimuth angle combination and/or any one elevation angle of the reception elevation angle combination, determine a reception beam deflection vector corresponding to the UCA of the receiver; and traverse the azimuth angles of the reception azimuth angle combination and/or the elevation angles of the reception elevation angle combination to determine a plurality of reception beam deflection vectors corresponding to respective antenna elements.

Furthermore, in an embodiment of the present disclosure, the apparatus is configured to determine the reception beam deflection vectors in the following step: the reception beam deflection vector $W_{2(m,n)}$ corresponding to an i-th antenna element is:

$$W_{2(m,n)} = e^{j\frac{2\pi}{\lambda}R_{t2}cos\left(\varphi_{m2}+\frac{2\pi i}{K}\right)sin(\theta_{n2})}.$$

Where, $\lambda$ represents a wavelength of the second OAM reception beam, $R_{t2}$ represents a radius of the UCA of the receiver, $\varphi_{m2}$ represents any one azimuth angle of the reception azimuth angle combination, $\theta_{n2}$ represents any elevation angle of the reception elevation angle combination, j is a complex number, and K is an integer used to indicate the number of the UCA antenna elements of the receiver.

Furthermore, in an embodiment of the present disclosure, the weight value a of each antenna element is $a=e^{jl\phi}$. Where l represents a modal of the OAM, $\varphi$ represents an included angle between a projection of the antenna element on the UCA surface of the receiver and the coordinate axis of the UCA of the receiver, and j is a complex number.

Furthermore, in an embodiment of the present disclosure, the apparatus is further configured to: for each antenna element of the UCA of the receiver included in the reception beam deflection vectors corresponding to the UCA of the receiver, based on a product of the reception beam deflection vector corresponding to the antenna element and the weight value of the antenna element, determine a reception direction; and traverse the plurality of reception beam deflection vectors corresponding to the UCA of the receiver, determine the plurality of reception directions.

Furthermore, in an embodiment of the present disclosure, the apparatus for determining the OAM beam transmission direction is further configured to: based on the OAM beam reception direction, receive a beam transmitted by the sender based on the OAM beam transmission direction.

In order to implement the above embodiments, the present disclosure further provides a computer storage medium.

The computer storage medium provided by the embodiments of the present disclosure stores executable programs; the executable programs are executed by a processor to perform the method of determining the OAM beam transmission direction according to any one of FIG. 1 to FIG. 4 or FIG. 5 to FIG. 9.

In order to implement the above embodiments, the present disclosure further provides a computer program product including computer programs, where the computer programs are executed by a processor to perform the method of determining the OAM beam transmission direction according to any one of FIG. 1 to FIG. 4 or FIG. 5 to FIG. 9.

Furthermore, in order to implement the above embodiments, the present disclosure further provides a computer program which is executed by a processor to perform the method of determining the OAM beam transmission direction according to any one of FIG. 1 to FIG. 4 or FIG. 5 to FIG. 9.

Figure 12:
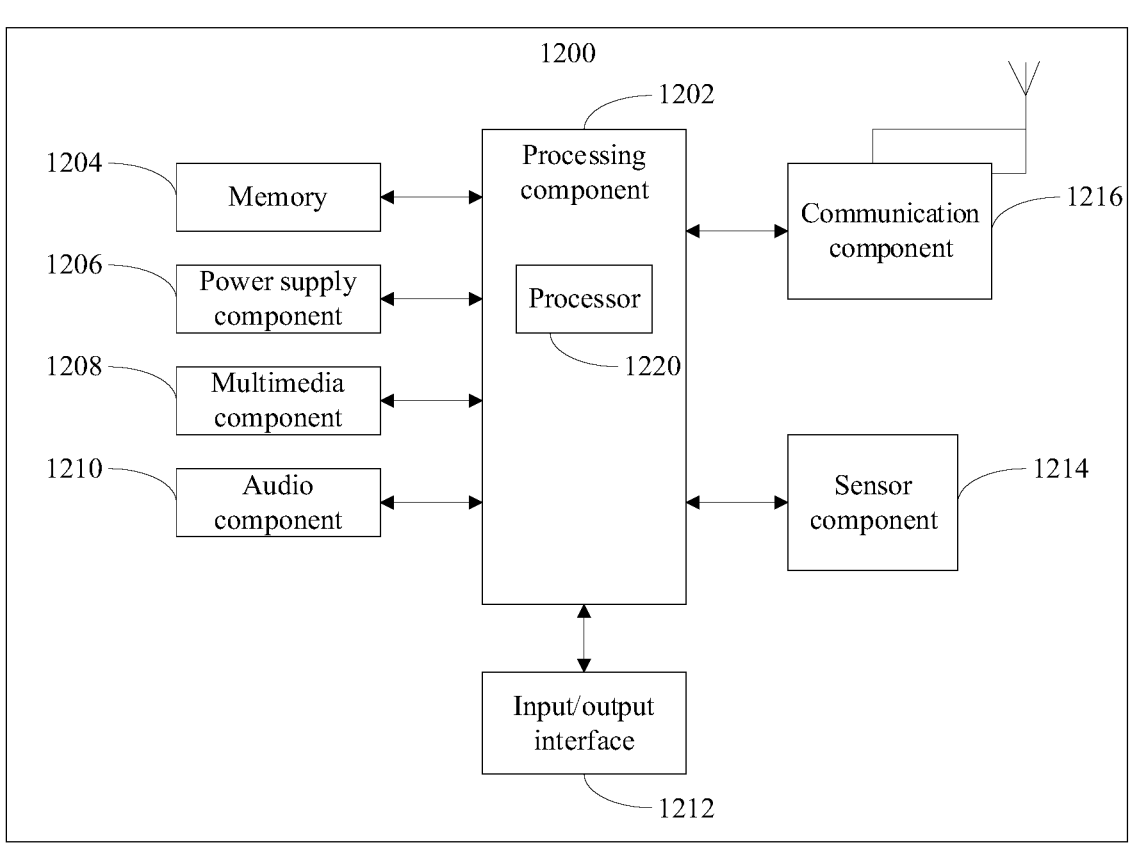
FIG. 12 is a block diagram illustrating a terminal device according to an embodiment of the present disclosure.

FIG. 12 is a block diagram illustrating a User Equipment (UE) 1200 according to an embodiment of the present disclosure. For example, the UE 1200 can be a mobile phone, a computer, a digital broadcast terminal device, a message transceiver, a game console, a tablet device, a medical device, a fitness device, a personal digital assistant, and the like.

As shown in FIG. 12, the UE 1200 can include one or more of the following components: a processing component 1202, a memory 1204, a power supply component 1206, a multimedia component 1208, an audio component 1210, an input/output (I/O) interface 1212, a sensor component 1214, and a communication component 1216.

The processing component 1202 generally controls overall operations of the UE 1200, such as operations associated with display, phone calls, data communications, camera operations, and recording operations. The processing component 1202 can include one or more processors 1220 to execute instructions to complete all or part of the steps of the above methods. In addition, the processing component 1202 can include one or more modules that facilitate the interaction between the processing component 1202 and other components. For example, the processing component 1202 can include a multimedia module to facilitate the interaction between the multimedia component 1208 and the processing component 1202.

The memory 1204 is configured to store various types of data to support the operation of the UE 1200. Examples of such data include instructions for any application or method operated on the UE 1200, contact data, phonebook data, messages, pictures, videos, and so on. The memory 1204 can be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 1206 supplies power for different components of the UE 1200. The power supply component 1206 can include a power supply management system, one or more power supplies, and other components associated with generating, managing, and distributing power for the UE 1200.

The multimedia component 1208 includes a screen that provides an output interface between the UE 1200 and a user. In some examples, the screen can include a liquid crystal display (LCD) and a touch panel (TP). If the screen includes a touch panel, the screen can be implemented as a touch screen to receive input signals from the user. The touch panel includes one or more touch sensors to sense touches, slides, and gestures on the touch panel. The touch sensor can not only sense the boundary of touch or slide actions but also detect the duration and pressure associated with touch or slide operations. In some examples, the multimedia component 1208 includes a front camera and/or a rear camera. When the UE 1200 is in an operation mode, such as a shooting mode or a video mode, the front camera and/or the rear camera can receive external multimedia data. Each of the front and rear cameras can be a fixed optical lens system or have a focal length and an optical zoom capability.

The audio component 1210 is configured to output and/or input audio signals. For example, the audio component 1210 includes a microphone (MIC) configured to receive an external audio signal when the UE 1200 is in an operation mode, such as a call mode, a recording mode, and a voice recognition mode. The received audio signal can be further stored in the memory 1204 or transmitted via the communication component 1216. In some examples, the audio component 1210 also includes a loudspeaker for outputting an audio signal.

The I/O interface 1212 provides an interface between the processing component 1202 and a peripheral interface module, which can be a keyboard, a click wheel, a button, or the like. These buttons can include, but are not limited to a home button, a volume button, a start button, and a lock button.

The sensor component 1214 includes one or more sensors for providing a status assessment in various aspects to the UE 1200. For example, the sensor component 1214 can detect an open/closed state of the UE 1200, and the relative positioning of components, for example, the component is a display and a keypad of the UE 1200. The sensor component 1214 can also detect a change in position of the UE 1200 or a component of the UE 1200, the presence or absence of a user in contact with the UE 1200, the orientation or acceleration/deceleration of the UE 1200, and a change in temperature of the UE 1200. The sensor component 1214 can include a proximity sensor configured to detect the presence of nearby objects without any physical contact. The sensor component 1214 can also include a light sensor, such as a CMOS or CCD image sensor, for use in imaging applications. In some examples, the sensor component 1214 can also include an acceleration sensor, a gyro sensor, a magnetic sensor, a pressure sensor, or a temperature sensor.

The communication component 1216 is configured to facilitate wired or wireless communication between the UE 1200 and other devices. The UE 1200 can access a wireless network based on a communication standard, such as WiFi, 2G or 3G, or a combination thereof. In an example, the communication component 1216 receives broadcast signals or broadcast-associated information from an external broadcast management system via a broadcast channel. In an example, the communication component 1216 also includes a near field communication (NFC) module to facilitate short range communication. For example, the NFC module can be implemented based on a radio frequency identification (RFID) technology, an infrared data association (IrDA) technology, an ultrawide band (UWB) technology, a Bluetooth (BT) technology, and other technologies.

In an example, the UE 1200 can be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic elements for performing the above methods.

Figure 13:
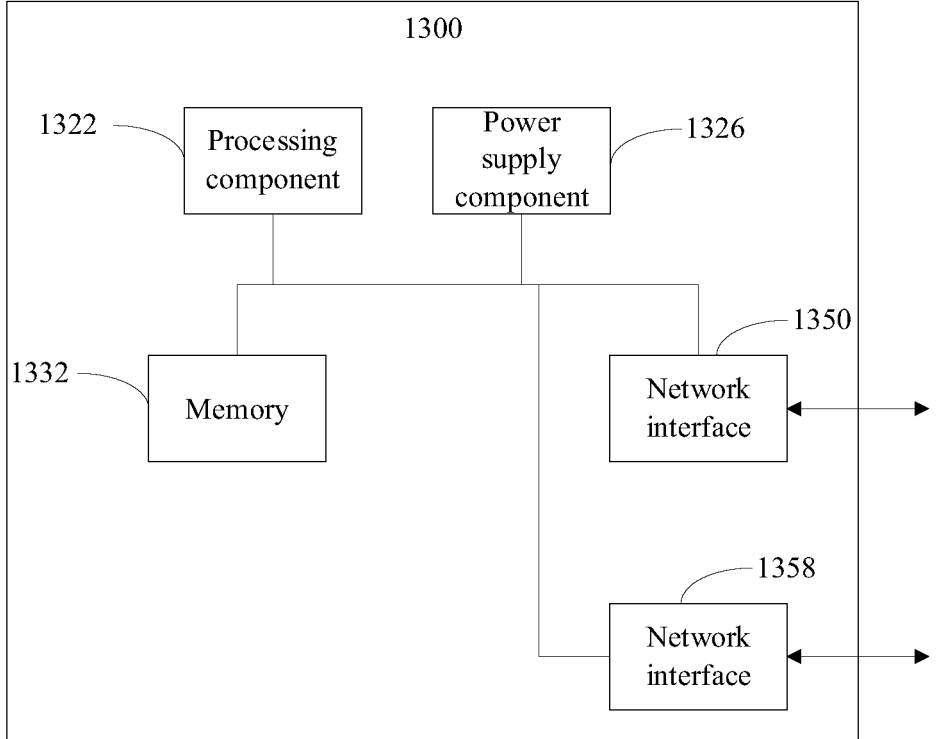
FIG. 13 is a block diagram illustrating an access network device according to an embodiment of the present disclosure.

FIG. 13 is a structural schematic diagram illustrating a base station 1300 according to an embodiment of the present disclosure. For example, the base station 1300 can be provided as a base station. As shown in FIG. 13, the base station 13 can include a processing component 1322, which further includes at least one processor (not shown) and a memory resource represented by a memory 1332 for storing instructions executed by the processing component 1322, for example, an application program. The application program stored in the memory 1332 can include one or more modules each of which corresponds to one set of instructions. Furthermore, the processing component 1322 is configured to execute instructions to perform any one of the above methods applied to the base station, for example, the method as shown in FIG. 1.

The base station 1300 can further include one power supply component 1326 configured to perform power management for the base station 1300, one wired or wireless network interface 1350 configured to connect the base station 1300 to a network, and one input/output (I/O) interface 1358. The base station 1300 can be operated based on an operating system stored in the memory 1332, for example, based on Windows Server™, Mac OS X™, Unix™, Linux™, FreeBSD™ or the like.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications, replacements, and combinations can be made without departing from the scope thereof. The scope of the present disclosure is limited only by the appended claims.

The invention claimed is:

1. A method of determining an Orbital Angular Momentum (OAM) beam transmission direction, performed by a sender and comprising:

determining a transmitting azimuth angle combination for transmitting first OAM beams, wherein the transmitting azimuth angle combination comprises a plurality of transmitting azimuth angles, one of which is an included angle between a projection of a first OAM beam axis on a uniform circular array (UCA) surface of the sender and a coordinate axis of a UCA of the sender;

determining a transmitting elevation angle combination for transmitting the first OAM beams, wherein the transmitting elevation angle combination comprises a plurality of transmitting elevation angles, one of which is an included angle between the first OAM beam axis and a UCA plane normal of the sender;

generating, based on the transmitting azimuth angle combination and the transmitting elevation angle combination, a plurality of transmitting directions;

transmitting, based on the plurality of transmitting directions, the first OAM beams to a receiver;

receiving beam information of a target transmitting beam sent by the receiver; and determining, based on the beam information, the OAM beam transmission direction;

wherein the target transmitting beam is a beam with an optimal signal quality in the first OAM beams, and the beam information comprises a transmitting azimuth angle and a transmitting elevation angle corresponding to the target transmitting beam.

2. The method of claim 1, wherein the transmitting azimuth angle combination is determined in the following formula:

the transmitting azimuth angle combination is:

$$\left\{\frac{2\pi \times m}{M_1}, (m = 0, 1, 2 \ldots M_1)\right\};$$

wherein $M_1$ is an integer used to indicate a number of the transmitting azimuth angles in the transmitting azimuth angle combination;

the transmitting elevation angle combination is determined in the following formula:

the transmitting elevation angle combination is:

$$\left\{\frac{\pi \times n}{N_1}, \left(n = 0, 1, 2 \ldots \frac{N_1}{2}\right)\right\},$$

and wherein $N_1$ is an integer used to indicate a number of the transmitting elevation angles in the transmitting elevation angle combination.

3. The method of claim 1, wherein generating, based on the transmitting azimuth angle combination and the transmitting elevation angle combination, the plurality of transmitting directions comprises:

determining, based on the transmitting azimuth angle combination and the transmitting elevation angle combination, transmitting beam deflection vectors corresponding to the UCA of the sender, wherein the transmitting beam deflection vectors corresponding to the UCA of the sender comprise a transmitting beam deflection vector corresponding to each antenna element of the UCA of the sender; and generating, based on the transmitting beam deflection vectors corresponding to the UCA of the sender and a weight value of each antenna element of the UCA of the sender, the plurality of transmitting directions.

4. The method of claim 3, wherein determining, based on the transmitting azimuth angle combination and the transmitting elevation angle combination, the transmitting beam deflection vectors corresponding to the UCA of the sender comprises:

determining, based on any one transmitting azimuth angle of the transmitting azimuth angle combination and any one transmitting elevation angle of the transmitting elevation angle combination, a transmitting beam deflection vector corresponding to the UCA of the sender; and traversing the transmitting azimuth angles of the transmitting azimuth angle combination and the transmitting elevation angles of the transmitting elevation angle combination to generate the transmitting beam deflection vectors corresponding to the UCA of the sender.

5. The method of claim 4, wherein the transmitting beam deflection vectors are determined in the following steps:

the transmitting beam deflection vector $W_{1(m,n)}$ corresponding to an i-th antenna element is:

$$W_{1(m,n)} = e^{j\frac{2\pi}{\lambda}R_{t1}cos\left(\varphi_{m1}+\frac{2\pi i}{K}\right)sin(\theta_{n1})};$$

wherein, $\lambda$ represents a wavelength of the first OAM beam, $R_{t1}$ represents a radius of the UCA of the sender, $\varphi_{m1}$ represents any one transmitting azimuth angle of the transmitting azimuth angle combination, $\theta_{n1}$ represents any one transmitting elevation angle of the transmitting elevation angle combination, j is a complex number, and K is an integer used to indicate the number of the UCA antenna elements of the sender.

6. The method of claim 3, wherein the weight value a of each antenna element is $a = e^{jl\Phi}$;

wherein l represents a modal of the OAM, $\varphi$ represents an included angle between a projection of the antenna element on the UCA surface of the sender and the coordinate axis of the UCA of the sender, and j is a complex number.

7. The method of claim 3, wherein generating, based on the transmitting beam deflection vectors corresponding to the UCA of the sender and the weight value of each antenna element of the UCA of the sender, the plurality of transmitting directions comprises:

for each antenna element of the UCA of the sender comprised in the transmitting beam deflection vectors corresponding to the UCA of the sender, determining, based on a product of the transmitting beam deflection vector corresponding to the antenna element and the weight value of the antenna element, a transmitting direction; and traversing the transmitting beam deflection vectors corresponding to the UCA of the sender to determine the plurality of transmitting directions.

8. The method of claim 1, wherein after receiving the beam information of the target transmitting beam sent by the receiver, the method further comprises:

transmitting, based on the OAM beam transmission direction, a plurality of second OAM transmission beams.

9. A method of determining an Orbital Angular Momentum (OAM) beam transmission direction, performed by a receiver and comprising:

receiving a plurality of first OAM beams transmitted by a sender, wherein the plurality of first OAM beams are transmitted based on a plurality of transmitting directions that are generated based on a transmitting azimuth angle combination for transmitting the first OAM beams and a transmitting elevation angle combination for transmitting the first OAM beams, the transmitting azimuth angle combination comprises a plurality of transmitting azimuth angles, one of which is an included angle between a projection of a first OAM beam axis on a uniform circular array (UCA) surface of the sender and a coordinate axis of a UCA of the sender, and the transmitting elevation angle combination comprises a plurality of transmitting elevation angles, one of which is an included angle between the first OAM beam axis and a UCA plane normal of the sender;

determining, based on a detection result associated with the plurality of first OAM beams, a target transmitting beam from the plurality of first OAM beams, wherein the target transmitting beam is a beam with an optimal signal quality in the first OAM beams; and sending beam information of the target transmitting beam to the sender such that the sender determines an OAM beam transmission direction based on the beam information, wherein the beam information comprises a transmitting azimuth angle and a transmitting elevation angle corresponding to the target transmitting beam.

10. The method of claim 9, wherein determining the target transmitting beam from the plurality of first OAM beams comprises at least one of:

selecting, based on a reference signal receiving power (RSRP) and a reference signal receiving quality (RSRQ), the target transmitting beam from the plurality of first OAM beams; or selecting, based on a bit error rate (BER) and a block error ratio (BLER), the target transmitting beam from the plurality of first OAM beams.

11. The method of claim 9, further comprising:

determining a plurality of reception directions;

receiving, based on the plurality of reception directions, a plurality of second OAM transmission beams transmitted by the sender to obtain second OAM reception beams;

determining, based on a detection result associated with the second OAM reception beams, a target reception beam from the second OAM reception beams; and determining a reception direction corresponding to the target reception beam as an OAM beam reception direction.

12. The method of claim 11, wherein determining the plurality of reception directions comprises at least one of:

determining a reception azimuth angle combination of the second OAM reception beams, wherein the reception azimuth angle combination comprises a plurality of reception azimuth angles, one of which is an included angle between a projection of a second OAM reception beam axis on a Uniform Circular Array (UCA) surface of the receiver and a coordinate axis of a UCA of the receiver; or determining a reception elevation angle combination of the second OAM reception beams, wherein the reception elevation angle combination comprises a plurality of reception elevation angles, one of which is an included angle between the second OAM reception beam axis and a UCA plane normal of the receiver; and the method further comprises at least one of:

determining, based on the reception azimuth angle combination and reception elevation angle combination, the plurality of reception directions; or receiving, based on the OAM beam reception direction, a beam transmitted by the sender based on the OAM beam transmission direction.

13. The method of claim 12, wherein the reception azimuth angle combination is determined in the following formula:

the reception azimuth angle combination is:

$$\left\{\frac{2\pi \times m}{M_2}, (m = 0, 1, 2 \ldots M_2)\right\};$$

and wherein $M_2$ is an integer used to indicate a number of reception azimuth angles in the reception azimuth angle combination; and the reception elevation angle combination is determined in the following formula:

the reception elevation angle combination is:

$$\left\{\frac{\pi \times n}{N_2}, \left(n = 0, 1, 2 \ldots \frac{N_2}{2}\right)\right\},$$

and wherein $N_2$ is an integer used to indicate a number of reception elevation angles in the reception elevation angle combination.

14. The method of claim 12, wherein determining, based on the reception azimuth angle combination and reception elevation angle combination, the plurality of reception directions comprises:

determining, based on the reception azimuth angle combination and reception elevation angle combination, reception beam deflection vectors corresponding to the UCA of the receiver, wherein the reception beam deflection vectors corresponding to the UCA of the receiver comprise a reception beam deflection vector corresponding to each antenna element in the UCA of the receiver; and determining, based on the reception beam deflection vectors corresponding to the UCA of the receiver and a weight value of each antenna element, the plurality of reception directions.

15. The method of claim 14, wherein determining, based on the reception azimuth angle combination and reception elevation angle combination, the reception beam deflection vectors corresponding to the UCA of the receiver comprises:

determining, based on any one azimuth angle of the reception azimuth angle combination and any one elevation angle of the reception elevation angle combination, a reception beam deflection vector corresponding to the UCA of the receiver; and traversing the azimuth angles of the reception azimuth angle combination and the elevation angles of the reception elevation angle combination to determine reception beam deflection vectors corresponding to respective antenna elements.

16. The method of claim 15, wherein the reception beam deflection vectors are determined in the following step:

the reception beam deflection vector $W_{2(m,n)}$ corresponding to an i-th antenna element is:

$$W_{2(m,n)} = e^{j\frac{2\pi}{\lambda}R_{t2}\cos\left(\varphi_{m2}+\frac{2\pi i}{K}\right)\sin(\theta_{n2})};$$

wherein, $\lambda$ represents a wavelength of the second OAM reception beam, $R_{t2}$ represents a radius of the UCA of the receiver, $\varphi_{m2}$ represents any one azimuth angle of the reception azimuth angle combination, $\theta_{n2}$ represents any one elevation angle of the reception elevation angle combination, j is a complex number, and K is an integer used to indicate the number of the UCA antenna elements of the receiver.

17. The method of claim 14, wherein the weight value a of each antenna element is $a=e^{jl\phi}$;

wherein l represents a modal of the OAM, $\varphi$ represents an included angle between a projection of the antenna element on the UCA surface of the receiver and the coordinate axis of the UCA of the receiver, and j is a complex number.

18. The method of claim 14, wherein determining, based on the reception beam deflection vectors corresponding to the UCA of the receiver and the weight value of each antenna element, the plurality of reception directions comprises:

for each antenna element of the UCA of the receiver comprised in the reception beam deflection vectors corresponding to the UCA of the receiver, determining, based on a product of the reception beam deflection vector corresponding to the antenna element and the weight value of the antenna element, a reception direction; and traversing the reception beam deflection vectors corresponding to the UCA of the receiver to determine the plurality of reception directions.

19. A terminal device, comprising a transceiver; a memory; a processor connected to the transceiver and the memory and configured to execute computer executable instructions in the memory to control wireless signal reception and transmission of the transceiver and perform the method according to claim 1.

* * * * *